US008077565B2

(12) United States Patent
Shimamoto

(10) Patent No.: US 8,077,565 B2
(45) Date of Patent: Dec. 13, 2011

(54) OPTICAL DISC DEVICE AND LENS TILT CONTROL METHOD

(75) Inventor: Takeshi Shimamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 69 days.

(21) Appl. No.: 12/663,034

(22) PCT Filed: Jun. 5, 2008

(86) PCT No.: PCT/JP2008/001440
§ 371 (c)(1),
(2), (4) Date: Dec. 4, 2009

(87) PCT Pub. No.: WO2008/149557
PCT Pub. Date: Dec. 11, 2008

(65) Prior Publication Data
US 2010/0177620 A1    Jul. 15, 2010

(30) Foreign Application Priority Data

Jun. 6, 2007    (JP) .................................. 2007-150218
Nov. 6, 2007   (JP) .................................. 2007-288379

(51) Int. Cl.
*G11B 7/00* (2006.01)

(52) U.S. Cl. .................................. 369/44.32; 369/53.19

(58) Field of Classification Search ............... 369/44.32, 369/44.35, 53.12, 53.14, 53.17, 53.18, 53.19, 369/53.1, 53.13, 47.44
See application file for complete search history.

(56) References Cited

U.S. PATENT DOCUMENTS

| | | | | |
|---|---|---|---|---|
| 5,475,667 | A  * | 12/1995 | Kamimura et al. | 369/53.14 |
| 6,952,384 | B1 * | 10/2005 | Shoji et al. | 369/44.35 |
| 7,054,241 | B2 * | 5/2006 | Kondo et al. | 369/44.32 |
| 7,206,351 | B2 * | 4/2007 | Okumura et al. | 375/262 |
| 7,274,631 | B2 * | 9/2007 | Kumagai | 369/44.32 |
| 7,486,602 | B2 * | 2/2009 | Raaymakers | 369/53.34 |
| 2006/0262702 | A1 | 11/2006 | Ide et al. | |

FOREIGN PATENT DOCUMENTS

| | | |
|---|---|---|
| JP | 07-014197 | 1/1995 |
| JP | 2001-205856 | 7/2001 |
| JP | 2003-022552 | 1/2003 |
| JP | 2004-342314 | 12/2004 |
| JP | 2006-134391 | 5/2006 |
| JP | 2006-323907 | 11/2006 |
| JP | 2007-073089 | 3/2007 |

OTHER PUBLICATIONS

International Search Report for corresponding application No. PCT/JP2008/001440 dated Sep. 16, 2008.

* cited by examiner

*Primary Examiner* — Nabil Z Hindi
(74) *Attorney, Agent, or Firm* — Renner, Otto, Boisselle & Sklar, LLP

(57) ABSTRACT

With an optical disc apparatus of the present invention, the number of tracks of an optical disc crossed by a light spot when the tracking control is inactive is measured and stored in a memory for each passage of a predetermined rotation angle. When the tracking control is active, a lens tilt driving signal is generated by multiplying the value of a memory section corresponding to the disc rotation angle by a gain according to the disc rotation speed, thereby correcting the AC tilt occurring due to a lens shift.

24 Claims, 13 Drawing Sheets

RADIAL DIRECTION (a)

— A: NUMBER OF TRACKS CROSSED
- - B: AMOUNT OF CHANGE IN NUMBER OF TRACKS CROSSED
— C: AMOUNT OF TRACKING ACTUATOR DISPLACEMENT (b)

OPTICAL DISC DEVICE AND LENS TILT CONTROL METHOD

TECHNICAL FIELD

The present invention relates to controlling a lens tilt in an optical disc apparatus for recording/reproducing information to/from an optical disc by irradiating a recording surface thereof with laser light. Particularly, the present invention relates to a method for correcting an AC tilt occurring when an objective lens is displaced in a tracking direction.

BACKGROUND ART

In recent years, optical discs called "next-generation DVDs" have begun to appear in the market, such as Blu-ray discs and HD-DVDs (Digital Versatile Discs), for which blue-violet laser light is used in an optical disc apparatus. An optical disc apparatus that accommodates such an optical disc is also required to be compatible with legacy optical discs such as CDs (Compact Discs) and DVDs. Therefore, the optical pickup is required to have three laser light sources of different emission wavelengths and an actuator for driving one or two objective lenses.

As with conventional optical disc apparatuses for CDs/DVDs, there is a demand also for such optical disc apparatuses to increase the recording/reproduction speed and to further reduce the thickness thereof so that they can be installed in notebook PCs, or the like.

In order to realize a reduction in the thickness of an optical disc apparatus, it is necessary to reduce the thickness of the optical pickup. In order to increase the recording/reproduction speed, it is necessary to increase the driving power of the actuator and also to reduce the weights of the objective lens and the actuator, which form the moving section.

An optical disc apparatus using blue-violet laser light has a working distance (the distance from the objective lens to the optical disc surface; hereinafter referred to as the "WD") as small as about 0.3 mm, whereas a conventional optical disc apparatus for CDs/DVDs has a WD as large as about 0.9 mm.

The center of gravity of the moving section will deviate substantially from the center about which the actuator is driven if one designs an objective lens actuator so as to accommodate all optical discs of substantially different WDs while taking into consideration that an actuator needs to have a sufficient range of motion in order to accommodate the surface deviation of an optical disc.

FIG. 10 is a cross-sectional view showing a moving section of an optical pickup, showing an actuator including a casing on which an objective lens is fixed. Since it is necessary to arrange an objective lens on the upper side of the moving section in order to accommodate Blu-ray discs with a smaller WD, the center of gravity 401 of the moving section deviates from the center 402 about which the moving section is driven.

One way to lower the center of gravity is to provide a counterweight under the moving section, but it will be difficult to drive the moving section at a high speed if the weight increases.

With such an actuator, driving the objective lens along the tracking driving direction 403 generates a force also in a direction shown as the rolling direction 404, thereby causing the objective lens to roll and thus tilting the objective lens with respect to the recording surface of the optical disc. The tilt of the objective lens occurring when the actuator is driven in the tracking direction as described above is called an AC tilt. As shown in FIG. 8, the amount of the AC tilt increases in proportion to the amount of displacement of the actuator in the tracking direction, and rapidly increases with the frequency of displacement. Patent Document 1 proposes a method for correcting such an AC tilt.

If a sensor for constantly detecting the AC tilt occurring is attached to the optical pickup, it is possible to correct the AC tilt according to the output of the sensor. However, in order to realize a thin optical pickup, it is difficult to reserve a space for installing the sensor therein.

Another possible way to correct the AC tilt is to correct the tilt based on the current supplied to the tracking coil when driving the actuator in the tracking direction.

[Patent Document 1] Japanese Laid-Open Patent Publication No. 2003-022552

DISCLOSURE OF INVENTION

Problems to be Solved by the Invention

With such a correction method, however, it is difficult to correct the AC tilt when the recording/reproduction speed is increased.

FIG. 11 is a graph showing the frequency characteristics of the AC tilt where the input is the tracking actuator driving current and the output is the amount of AC tilt for a configuration where the AC tilt is corrected by using the tracking actuator driving current. As shown in FIG. 11, it can be seen that the phase is reversed by 180° at a boundary around 60 Hz, which is the primary resonance frequency of the tracking actuator. Therefore, with the correction method using the driving current supplied to the tracking actuator, it is not possible to correct the AC tilt both in frequency bands below and above the primary resonance frequency of the tracking actuator.

A high-speed, thin optical disc apparatus is required to record/reproduce to/from an optical disc at a disc rotation speed of up to about 5000 rpm. This means that the tracking actuator is driven at 83.3 Hz following the eccentricity of the optical disc. The tracking actuator driving frequency when the optical disc spins at the maximum speed is beyond the primary resonance frequency, and it is not possible to appropriately correct the AC tilt in this zone.

Where the rotation speed of the optical disc is controlled at a constant linear velocity (CLV method), the rotation speed continuously varies from the inner periphery to the outer periphery of the optical disc. Therefore, depending on the recording/reproduction speed, the driving frequency repeatedly crosses the primary resonance frequency of the tracking actuator, making it difficult to appropriately correct the AC tilt.

The present invention has been made in view of such problems as set forth above, and provides an apparatus and method capable of appropriately correcting the AC tilt even if recording and/or reproduction are performed with high speeds.

Means for Solving the Problems

An optical disc apparatus of the present invention is an optical disc apparatus for irradiating an optical disc with laser light to perform at least one of recording and reproduction of information to/from the optical disc, the apparatus including: an optical pickup including an objective lens for concentrating the laser light; a tracking actuator for displacing the objective lens in a tracking direction along a radial direction of the optical disc; a lens tilt actuator for tilting the objective lens in the radial direction of the optical disc; a tracking actuator driving section for driving the tracking actuator; a lens tilt actuator driving section for driving the lens tilt actuator; and a control section for controlling an operation of the tracking actuator driving section and that of the lens tilt actuator driving section, wherein the control section controls the tilt of the objective lens based on the displacement of the objective lens in the tracking direction.

In one embodiment, the control section measures, for each passage of a predetermined rotation angle of the optical disc, the number of tracks of the optical disc a light spot of the laser light has crossed when a tracking control is not being performed; and the control section calculates an amount of displacement of the objective lens in the tracking direction based on a change in the number of tracks crossed for each passage of the predetermined rotation angle.

In one embodiment, the control section includes a memory, and the amount of displacement in the tracking direction is calculated only once upon startup of the optical disc and stored in the memory.

In one embodiment, the control section calculates a displacement frequency of the objective lens in the tracking direction based on a rotation speed of the optical disc.

In one embodiment, the control section controls the tilt of the objective lens based on the amount of displacement in the tracking direction and a rotation speed of the optical disc.

In one embodiment, the control section controls the tilt of the objective lens based further on a driving sensitivity of the lens tilt actuator.

In one embodiment, where the rotation speed of the optical disc is controlled by a CLV method, the control section recalculates an amount by which the tilt of the objective lens is controlled when the rotation speed of the optical disc has changed by a predetermined amount.

In one embodiment, where the rotation speed of the optical disc is controlled by a CLV method, the control section recalculates an amount by which the tilt of the objective lens is controlled when a radial position of the objective lens has changed by a predetermined amount.

In one embodiment, where the rotation speed of the optical disc is controlled by a CAV method, the control section controls the tilt of the objective lens while fixing the amount by which the tilt is controlled.

In one embodiment, the control section controls the tilt of the objective lens when a tracking control is active.

In one embodiment, the control section does not control the tilt of the objective lens when the tracking control is inactive.

In one embodiment, the control section controls the tilt of the objective lens when the displacement in the tracking direction is greater than a predetermined threshold value.

In one embodiment, the control section controls the tilt of the objective lens when an amount of eccentricity of the optical disc is greater than a predetermined threshold value.

In one embodiment, the control section changes a value of the predetermined threshold value depending on a type of the optical disc.

In one embodiment, the control section controls the tilt of the objective lens when a rotation speed of the optical disc is greater than a predetermined threshold value.

In one embodiment, the control section changes a value of the predetermined threshold value depending on a type of the optical disc.

In one embodiment, the apparatus further includes an index generator section for generating a reproduction signal quality index representing a quality of a reproduction signal obtained by reproducing information recorded on the optical disc, wherein: the control section adjusts a driving signal for tilting the objective lens based on the displacement of the objective lens in the tracking direction when a tracking control is not being performed; and the control section adjusts the driving signal based on the reproduction signal quality index when the tracking control is being performed.

In one embodiment, the control section adjusts the driving signal based on the displacement of the objective lens in the tracking direction, and then adjusts the driving signal based on the reproduction signal quality index.

In one embodiment, the control section measures the number of tracks of the optical disc that a light spot of the laser light has crossed when a tracking control is not being performed, and calculates the amount of displacement of the objective lens in the tracking direction based on a change in a period with which the light spot crosses the tracks.

In one embodiment, the control section determines the amount of displacement of the objective lens in the tracking direction based on a driving signal for driving the tracking actuator when the tracking control is being performed.

An optical disc apparatus of the present invention is an optical disc apparatus for irradiating an optical disc with laser light to perform at least one of recording and reproduction of information to/from the optical disc, the apparatus including: an optical pickup including an objective lens for concentrating the laser light; a tracking actuator for displacing the objective lens in a tracking direction along a radial direction of the optical disc; a lens tilt actuator for tilting the objective lens in the radial direction of the optical disc; a tracking actuator driving section for driving the tracking actuator; a lens tilt actuator driving section for driving the lens tilt actuator; a control section for controlling an operation of the tracking actuator driving section and that of the lens tilt actuator driving section; and an index generator section for generating a reproduction signal quality index representing a quality of a reproduction signal obtained by reproducing information recorded on the optical disc, wherein the control section controls the tilt of the objective lens based on the reproduction signal quality index.

In one embodiment, the index generator section generates the reproduction signal quality index a plurality of times over one revolution of the optical disc; and the control section controls the tilt of the objective lens based on a change in the reproduction signal quality index over one revolution of the optical disc.

In one embodiment, the control section controls the tilt of the objective lens based on an average value of the reproduction signal quality indices over one revolution of the optical disc.

In one embodiment, the control section controls the tilt of the objective lens based on a change in a value of the reproduction signal quality index over one revolution of the optical disc.

In one embodiment, where the rotation speed of the optical disc is controlled by a CLV method, the control section recalculates an amount by which the tilt of the objective lens is controlled when the rotation speed of the optical disc has changed by a predetermined amount.

In one embodiment, where the rotation speed of the optical disc is controlled by a CLV method, the control section recalculates an amount by which the tilt of the objective lens is controlled when a radial position of the objective lens has changed by a predetermined amount.

A control method of the present invention is a control method for controlling a lens tilt of an optical disc apparatus for irradiating an optical disc with laser light to perform at least one of recording and reproduction of information to/from the optical disc, the method including: a step of displacing an objective lens of an optical pickup in a tracking direction along a radial direction of the optical disc; a step of tilting the objective lens in the radial direction of the optical disc; and a step of controlling the tilt of the objective lens based on the displacement of the objective lens in the tracking direction.

In one embodiment, the method further includes: a step of generating a reproduction signal quality index representing a quality of a reproduction signal obtained by reproducing information recorded on the optical disc; and a step of adjusting a driving signal for tilting the objective lens based on the displacement of the objective lens in the tracking direction when a tracking control is not being performed, while adjusting the driving signal based on the reproduction signal quality index when the tracking control is being performed.

A control method of the present invention is a control method for controlling a lens tilt of an optical disc apparatus for irradiating an optical disc with laser light to perform at least one of recording and reproduction of information to/from the optical disc, the method including: a step of tilting an objective lens of an optical pickup in a radial direction of the optical disc; a step of generating a reproduction signal quality index representing a quality of a reproduction signal obtained by reproducing information recorded on the optical disc; and a step of controlling the tilt of the objective lens based on the reproduction signal quality index.

In one embodiment, the method further includes: a step of generating the reproduction signal quality index a plurality of times over one revolution of the optical disc; and a step of controlling the tilt of the objective lens based on a change in the reproduction signal quality index over one revolution of the optical disc.

An integrated circuit of the present invention is an integrated circuit provided in an optical disc apparatus for irradiating an optical disc with laser light to perform at least one of recording and reproduction of information to/from the optical disc, the optical disc apparatus including: an optical pickup including an objective lens for concentrating the laser light; a tracking actuator for displacing the objective lens in a tracking direction along a radial direction of the optical disc; a lens tilt actuator for tilting the objective lens in the radial direction of the optical disc; a tracking actuator driving section for driving the tracking actuator; and a lens tilt actuator driving section for driving the lens tilt actuator, the integrated circuit including a control section for controlling an operation of the tracking actuator driving section and that of the lens tilt actuator driving section, wherein the control section controls the tilt of the objective lens based on the displacement of the objective lens in the tracking direction.

In one embodiment, the integrated circuit further includes an index generator section for generating a reproduction signal quality index representing a quality of a reproduction signal obtained by reproducing information recorded on the optical disc, wherein the control section adjusts a driving signal for tilting the objective lens based on the displacement of the objective lens in the tracking direction when a tracking control is not being performed; and the control section adjusts the driving signal based on the reproduction signal quality index when the tracking control is being performed.

An integrated circuit of the present invention is an integrated circuit provided in an optical disc apparatus for irradiating an optical disc with laser light to perform at least one of recording and reproduction of information to/from the optical disc, the optical disc apparatus including: an optical pickup including an objective lens for concentrating the laser light; a tracking actuator for displacing the objective lens in a tracking direction along a radial direction of the optical disc; a lens tilt actuator for tilting the objective lens in the radial direction of the optical disc; a tracking actuator driving section for driving the tracking actuator; and a lens tilt actuator driving section for driving the lens tilt actuator, the integrated circuit including: a control section for controlling an operation of the tracking actuator driving section and that of the lens tilt actuator driving section; and an index generator section for generating a reproduction signal quality index representing a quality of a reproduction signal obtained by reproducing information recorded on the optical disc, wherein the control section controls the tilt of the objective lens based on the reproduction signal quality index.

In one embodiment, the index generator section generates the reproduction signal quality index a plurality of times over one revolution of the optical disc; and the control section controls the tilt of the objective lens based on a change in the reproduction signal quality index over one revolution of the optical disc.

Effects of the Invention

According to the present invention, the tilt of the objective lens is controlled based on the displacement of the objective lens in the tracking direction. It is possible to appropriately set the amount of lens tilt correction based on the relationship between the displacement of the objective lens in the tracking direction and the tilt thereof. Therefore, it is possible to realize a thin optical disc apparatus capable of recording/reproduction with high speeds.

Moreover, according to the present invention, the tilt of the objective lens is controlled based on the reproduction signal quality index. It is possible to realize a thin optical disc apparatus capable of recording/reproduction with high speeds by setting the amount of lens tilt correction so that the reproduction signal quality index improves.

Figure 1:
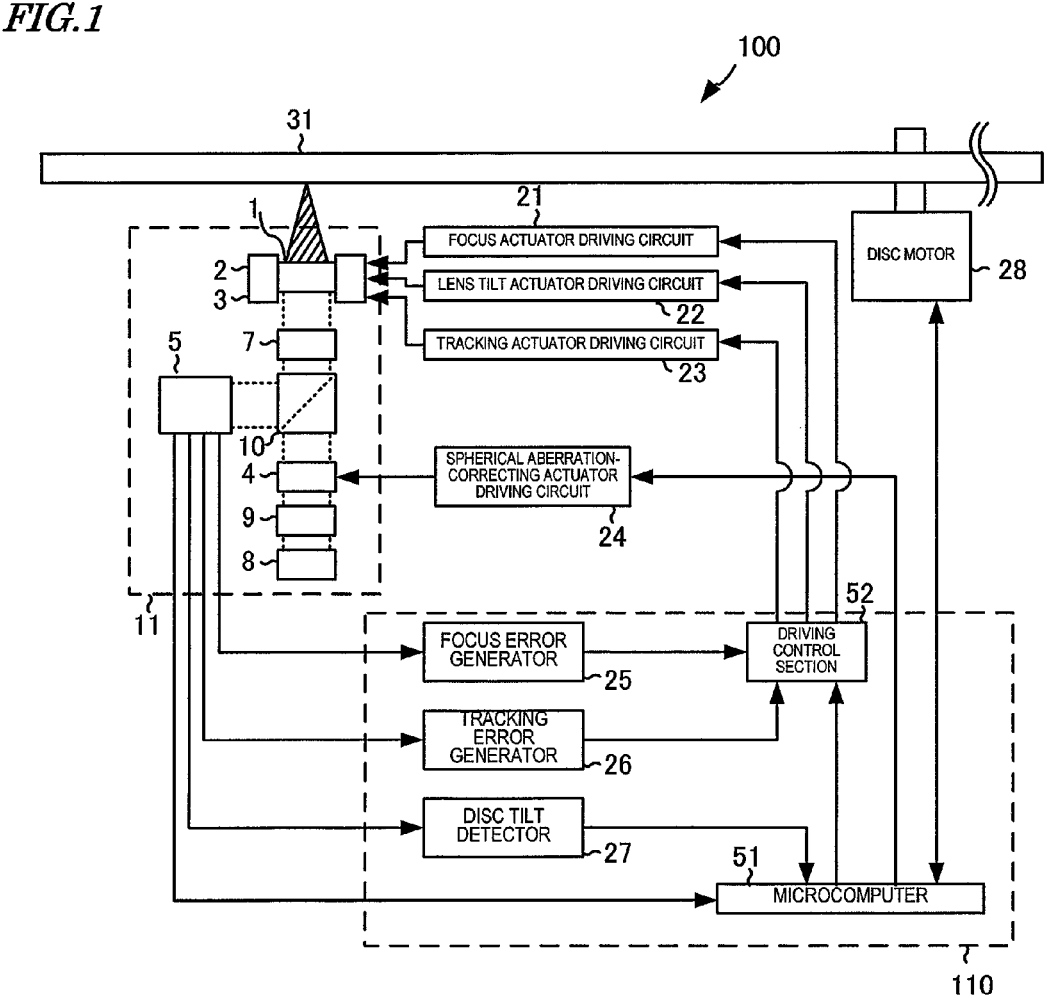
FIG. 1 A diagram showing an optical disc apparatus according to Embodiment 1 of the present invention.

DESCRIPTION OF THE REFERENCE NUMERALS 1 objective lens
2 focus actuator
3 tracking actuator
4 spherical aberration-correcting device
5 light-receiving section
7 ¼ wave plate
8 laser light source
9 collimator lens
10 polarizing beam splitter
11 optical pickup
21 focus actuator driving circuit
22 lens tilt actuator driving circuit
23 tracking actuator driving circuit
24 spherical aberration-correcting actuator driving circuit
25 focus error generator
26 tracking error generator
27 disc tilt detector
28 disc motor
29 RF signal generator
30 signal quality evaluator
31 optical disc
51 microcomputer
52 driving control section
100, 200 optical disc apparatus
101 focus actuator A
102 focus actuator B
110, 210 control section
201 tracking error signal
202 binarization circuit
203 counter
204 FG signal
205 frequency divider
206 eccentricity memory
301 tilt memory
302 lens tilt driving gain
303 lens tilt driving gain calculation section
401 center of gravity of moving section
402 center about which moving section is driven
403 tracking driving direction
404 rolling direction

BEST MODE FOR CARRYING OUT THE INVENTION

Embodiments of the present invention will now be described with reference to the drawings.

Embodiment 1

FIG. 1 is a block diagram showing an optical disc apparatus 100 of Embodiment 1 of the present invention. The optical disc apparatus 100 irradiates an optical disc 31 with laser light so as to perform at least one of recording and reproduction to/from the optical disc 31. The optical disc apparatus 100 is, for example, a recording/reproduction apparatus, a reproduction-only apparatus, a recording apparatus, or an editing apparatus.

The optical disc apparatus 100 includes an optical pickup 11, a control section 110, a focus actuator driving circuit 21, a lens tilt actuator driving circuit 22, a tracking actuator driving circuit 23, a spherical aberration-correcting actuator driving circuit 24, and a disc motor 28.

The optical pickup 11 irradiates the optical disc 31 with laser light and receives reflected light from the optical disc 31. The optical pickup 11 includes an objective lens 1, a focus actuator 2, a tracking actuator 3, a ¼ wave plate 7, a polarizing beam splitter 10, a spherical aberration-correcting device 4, a collimator lens 9, a laser light source 8, and a light-receiving section 5. The focus actuator 2 serves also as a lens tilt actuator.

The control section 110 controls the overall operation of the optical disc apparatus 100. The control section 110 includes a focus error generator 25, a tracking error generator 26, a disc tilt detector 27, a microcomputer 51, and a driving control section 52. The disc motor 28 spins the optical disc 31.

The laser light output from the laser light source 8 is collimated by the collimator lens 9, passes through the spherical aberration-correcting device 4, the polarizing beam splitter 10 and the ¼ wave plate 7, and is concentrated by the objective lens 1 to converge at the recording layer of the optical disc 31. The reflected light from the optical disc 31 passes through the objective lens 1 and the ¼ wave plate 7, and is reflected by the polarizing beam splitter 10 to enter the light-receiving section 5.

The light-receiving section 5 converts the reflected light from the optical disc 31 into an electrical signal. The output signal of the light-receiving section 5 is supplied to the focus error generator 25, the tracking error generator 26 and the disc tilt detector 27.

The focus error generator 25 detects the positional misalignment between the focus position of the laser light with which the optical disc 31 is irradiated and the recording layer of the optical disc 31, based on the output of the light-receiving section 5, and outputs a focus error signal. The focus error signal can be generated by a method called an "astigmatism method", for example.

The tracking error generator 26 detects the positional misalignment between the light spot of laser light formed on the recording layer of the optical disc 31 and the track on the recording layer of the optical disc 31, based on the output of the light-receiving section 5, and outputs a tracking error signal. The tracking error signal can be generated by a detection method commonly called a "push-pull method", for example.

The disc tilt detector 27 detects the misalignment between the optical axis direction of the objective lens 1 and the direction perpendicular to the surface of the optical disc 31, based on the output of the light-receiving section 5, and outputs a signal representing the misalignment to the microcomputer 51.

The focus error signal and the tracking error signal are supplied to the driving control section 52, where phase compensation, etc., are done, to generate control signals.

The focus actuator driving circuit 21, the lens tilt actuator driving circuit 22 and the tracking actuator driving circuit 23 supply driving signals to the focus actuator 2 and the tracking actuator 3 according to control signals from the driving control section 52, and drive the focus actuator 2 and the tracking actuator 3.

According to the driving signal from the focus actuator driving circuit 21, the focus actuator 2 displaces the objective lens 1 in the optical axis direction. According to the driving signal from the lens tilt actuator driving section 22, the focus actuator 2 tilts the objective lens 1 in the radial direction of the optical disc 31. According to the driving signal from the tracking actuator driving section 23, the tracking actuator 3 displaces the objective lens 1 in the tracking direction along the radial direction of the optical disc 31.

The focus actuator 2 and the tracking actuator 3 drive the objective lens 1 according to the driving signals from the focus actuator driving circuit 21 and the tracking actuator driving circuit 23.

As described above, the driving control section 52 controls the focus actuator driving circuit 21 for driving the focus actuator 2 according to the focus error signal, thereby forming a servo loop for focus control. It also controls the tracking actuator driving circuit 23 for driving the tracking actuator 3 according to the tracking error signal, thereby forming a servo loop for tracking control. Thus, servo control is performed.

Next, referring to FIGS. 2 and 3, a lens tilt method for the objective lens 1 will be described.

Figure 2:
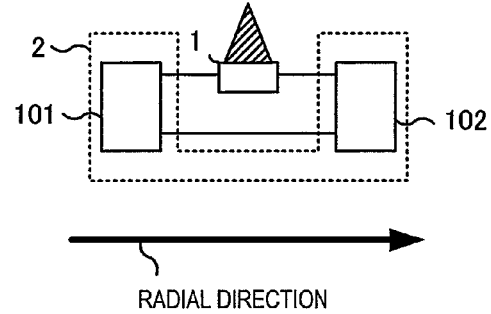
FIG. 2 A diagram showing an objective lens and a focus actuator according to Embodiment 1 of the present invention.

FIG. 2 is a diagram showing the objective lens 1 and the focus actuator 2. The focus actuator 2 includes a focus actuator A 101 and a focus actuator B 102 arranged symmetrically with respect to the objective lens 1 along the radial direction (the radial direction of the optical disc).

Figure 3:
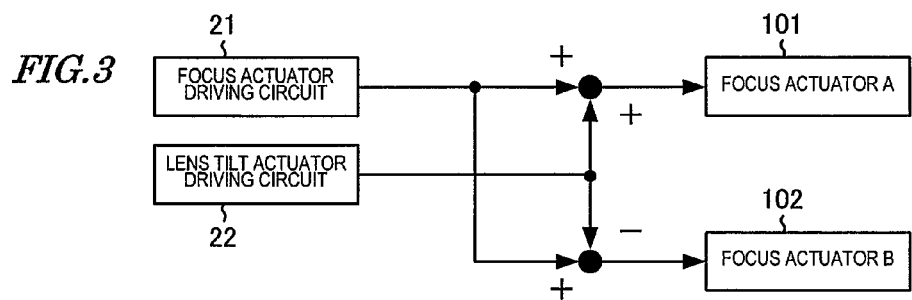
FIG. 3 A diagram showing how focus actuators are driven by actuator driving circuits of Embodiment 1 of the present invention so as to perform focus control and lens tilt control.

FIG. 3 is a diagram showing how the focus actuator A 101 and the focus actuator B 102 are driven by the focus actuator driving circuit 21 and the lens tilt actuator driving circuit 22.

A focus driving current is output from the focus actuator driving circuit 21, thus supplying the same amount of driving current to the focus actuator A 101 and to the focus actuator B 102. Moreover, a tilt driving current is output from the lens tilt actuator driving circuit 22. The focus actuator A 101 receives the focus driving current with the tilt driving current added thereto, and the focus actuator B 102 receives the focus driving current with the tilt driving current subtracted therefrom.

As a result, the pair of driving currents, upstream of which lies the focus actuator driving circuit 21, translate the objective lens 1, whereas the pair of driving currents, upstream of which lies the lens tilt actuator driving circuit 22, rotate the objective lens 1.

Thus, a lens tilt driving operation is realized by giving a driving current difference between the focus actuator A 101 and the focus actuator B 102.

Note that as a method for realizing the lens tilt driving operation, it is possible to use a separate lens tilt actuator. For example, an actuator for rotating the objective lens 1 may be provided separately.

Referring to FIG. 1, the spherical aberration-correcting actuator driving circuit 24 corrects the spherical aberration by supplying a driving signal to the spherical aberration-correcting device 4 according to the control signal from the microcomputer 51.

Note that the driving control section 52 and the microcomputer 51 are preferably implemented by one or more digital circuits. The control section 110 may be realized as a single semiconductor integrated circuit, in which case the elements of the control section 110 are mounted on a single semiconductor chip.

Next, a method by which the control section 110 detects the amount of displacement of the objective lens 1 in the tracking direction will be described.

With a thin optical pickup 11, it is difficult to reserve a space for accommodating a sensor for directly detecting the amount of displacement in the tracking direction. Therefore, it is necessary to estimate the amount of displacement in the tracking direction by another method.

Regarding the displacement of the objective lens 1 in the tracking direction, the factor by which the amount of displacement becomes greatest is due to the eccentricity component of the optical disc 31 and the disc motor 28. Since the fundamental frequency of the eccentricity component is equal to the rotation frequency of the optical disc 31, the frequency of displacement in the tracking direction can be calculated from the rotation speed of the optical disc.

Due to the eccentricity, the track of the optical disc 31 substantially displaces in synchronism with the rotation of the disc with respect to the light spot of the laser light. Therefore, in order to make the light spot follow the track, a current is supplied to the tracking actuator 3 to displace the objective lens 1.

Conversely, if the eccentricity component can be detected, one can know the amount by which the objective lens should be displaced in the tracking direction. Specifically, the eccentricity component can be obtained from the number of tracks the light spot crosses as the optical disc 31 spins when only the focus control of the objective lens 1 is active and the tracking control thereof is inactive (i.e., the zero-crossing count of the tracking error signal).

The track width of an optical disc is unique for each kind of optical discs, e.g., 0.32 μm for Blu-ray discs, 1.23 μm for DVD-RAMS, and 0.74 μm for DVD-Rs.

Once one knows the track pitch of the optical disc and can measure the number of tracks crossed per one disc revolution, it is possible to obtain the amount of displacement of the objective lens 1 in the tracking direction.

The control section 110 measures, for each passage of a predetermined rotation angle of the optical disc 31, the number of tracks the light spot has crossed when the tracking control is not being performed, and calculates the amount of displacement of the objective lens 1 in the tracking direction based on the total number of tracks crossed and the change in the number of tracks crossed for each passage of a predetermined rotation angle (the change in the period with which the light spot crosses tracks). The predetermined rotation angle is 15°, for example, but it is not limited thereto. Herein, the amount of eccentricity is calculated from the number of tracks crossed. The amount of displacement in the tracking direction can be calculated from the amount of eccentricity, and the amount by which the lens tilt is adjusted can be calculated from the amount of displacement in the tracking direction.

Note that in the description of embodiments of the present invention, even if a track is formed in a spiral pattern on the optical disc 31, adjacent runs of the track are each counted as a track, and it is defined herein that a plurality of tracks are formed on the optical disc 31.

Figure 4:
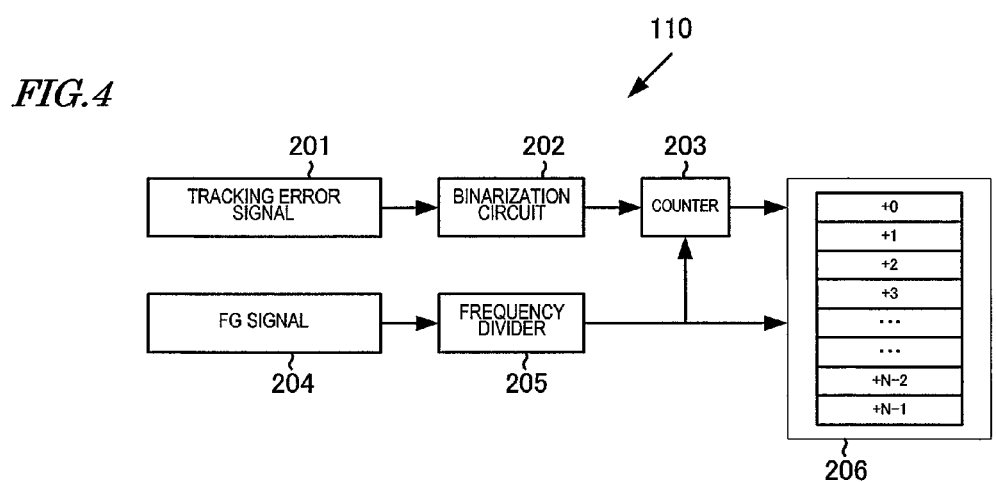
FIG. 4 A diagram showing an operation of measuring, and storing in an eccentricity memory, the amount of disc eccentricity from a tracking error signal according to Embodiment 1 of the present invention.
Figure 5:
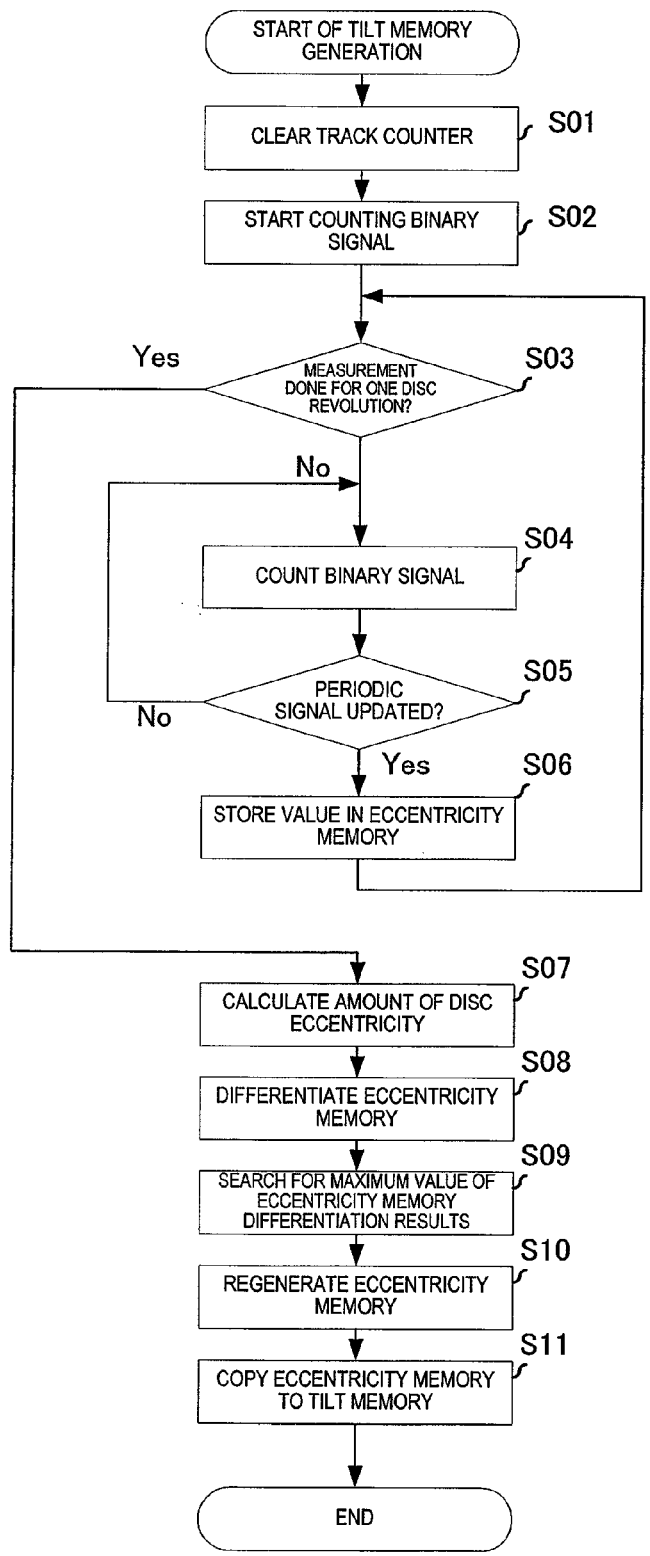
FIG. 5 A flow chart showing a process of generating a tilt memory according to Embodiment 1 of the present invention.

Referring to FIGS. 4 and 5, the procedure for obtaining the amount of eccentricity, i.e., the amount of displacement of the objective lens 1 in the tracking direction, will be described in greater detail.

Referring to FIG. 4, the control section 110 includes a binarization circuit 202, a frequency divider 205, a counter 203, and an eccentricity memory 206. These elements may be included in the driving control section 52.

A tracking error signal 201 is generated by the tracking error generator 26. The tracking error signal 201 is binarized by the binarization circuit 202 and supplied to the counter 203. An FG signal 204 is a binary signal output from the disc motor 28 in synchronism with the rotation of the disc motor 28. This is supplied to the frequency divider 205, and N (N is a positive integer) periodic signals are output and supplied to the counter 203 per one disc revolution. Where the number of tracks crossed is measured for each passage of a rotation angle of the optical disc 31 of 15°, N is 24.

Referring to FIGS. 4 and 5, the counter 203 first clears the track counter to 0 (S01) and starts counting the rising edges or falling edges of the binary signal output from the binarization circuit 202 (S02). The counter 203 continues the counting until the periodic signal from the frequency divider 205 changes, and gives the counted value to the eccentricity memory 206 when the periodic signal changes (S03 to S05). The eccentricity memory 206 stores the value at a predetermined address of the eccentricity memory 206 based on the periodic signal from the frequency divider 205 (S06). By repeating this operation for one disc revolution, there is obtained an accumulated value of the number of tracks crossed for each passage of a predetermined angle of the optical disc 31.

The amount of eccentricity D of the optical disc 31 can be obtained by dividing the accumulated value of the number of tracks crossed per one disc revolution by 4 and multiplying the result by the track pitch (S07). For example, where the accumulated value of the number of tracks crossed is 500, and the track pitch is 0.32 μm, the amount of eccentricity D of the disc is D=500/4×0.32=40 μm.

Next, the procedure for obtaining the amount of eccentricity of the disc (the amount of displacement in the tracking direction) from the accumulated value of the number of tracks crossed for each passage of a rotation angle of the disc will be described.

Figure 6:
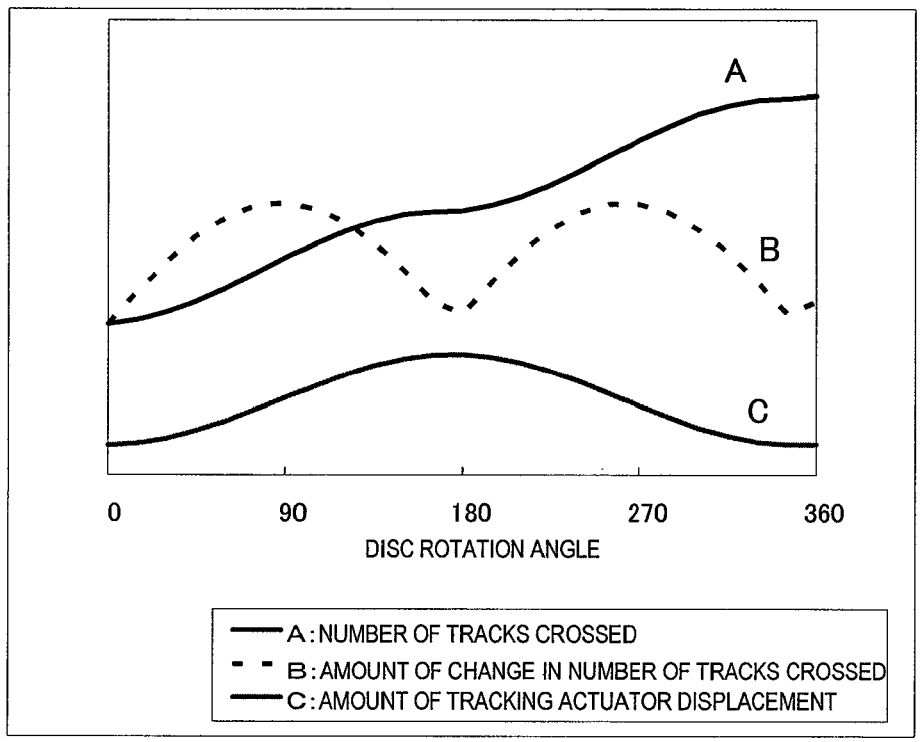
FIG. 6 (a) is a graph showing the number of tracks crossed per one disc revolution, the amount of change in the number of tracks crossed, and the amount of tracking actuator displacement according to Embodiment 1 of the present invention, and (b) is a graph showing the waveform of a tracking error signal corresponding to (a).
Figure 6:
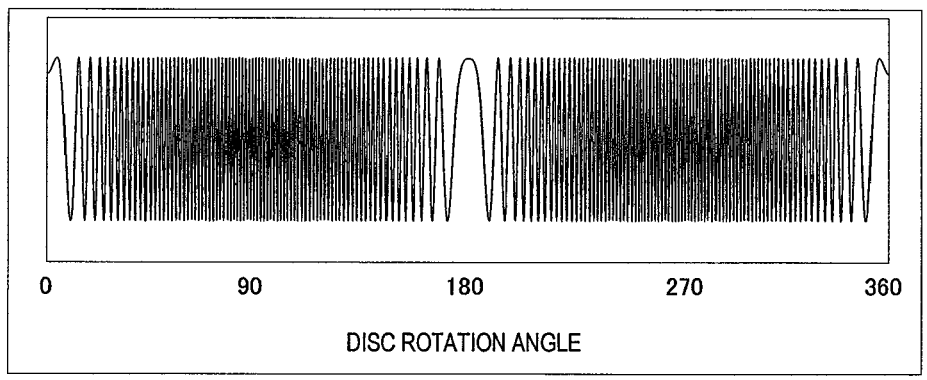

The relationship between the value of the eccentricity memory 206 and the amount of displacement of the tracking actuator is represented as shown in FIG. 6. The horizontal axis of FIG. 6(*a*) is the rotation angle during one disc revolution, A in the figure represents the accumulated value of the number of tracks crossed for one disc revolution, B represents the amount of change in the number of tracks crossed, which is obtained by differentiating A, and C represents the amount of displacement of the tracking actuator needed to follow the eccentricity. FIG. 6(*b*) shows the waveform of the tracking error signal corresponding to FIG. 6(*a*).

An angular region where the amount of change in the number of tracks crossed is small, i.e., an angular region where the value of the amount of change B is small (near 0° or near 180°) is an angular region where there is only a small amount of track crossing even if the disc is spinning. In other words, this can be said to be a state where the objective lens 1 is displaced in the tracking direction by the largest amount to follow the disc eccentricity when the tracking control is being performed. On the other hand, an angular region where the amount of change in the number of tracks crossed is large, i.e., an angular region where the value of the amount of change B is large (near 90° or near 270°) is an angular region where there is a large amount of track crossing when the disc is spinning. In other words, this can be said to be a state where the objective lens 1 is displaced in the tracking direction by the smallest amount when the tracking control is being performed. That is, the value obtained by differentiating the amount of change B corresponds to C, which is the amount of displacement of the objective lens 1 in the tracking direction.

Since the relationship between the amount of eccentricity and the disc rotation angle is obtained as described above, the contents of the eccentricity memory 206 are rewritten with the value obtained by differentiating the amount of change B (S08). In this process, it is preferred that the value of the eccentricity memory 206 is normalized with the amount of disc eccentricity D.

Now, the value of the rewritten eccentricity memory may not be the value obtained by differentiating the amount of change B. For example, it may be a SIN wave whose amplitude is equal to the amount of disc eccentricity D and whose beginning point is the angle at which the value obtained by differentiating the amount of change B is largest (0° or 180°) (S09). The data of the eccentricity memory is rewritten by performing either one of the operation of step S08 and the operation of step S09 (S10).

Figure 7:
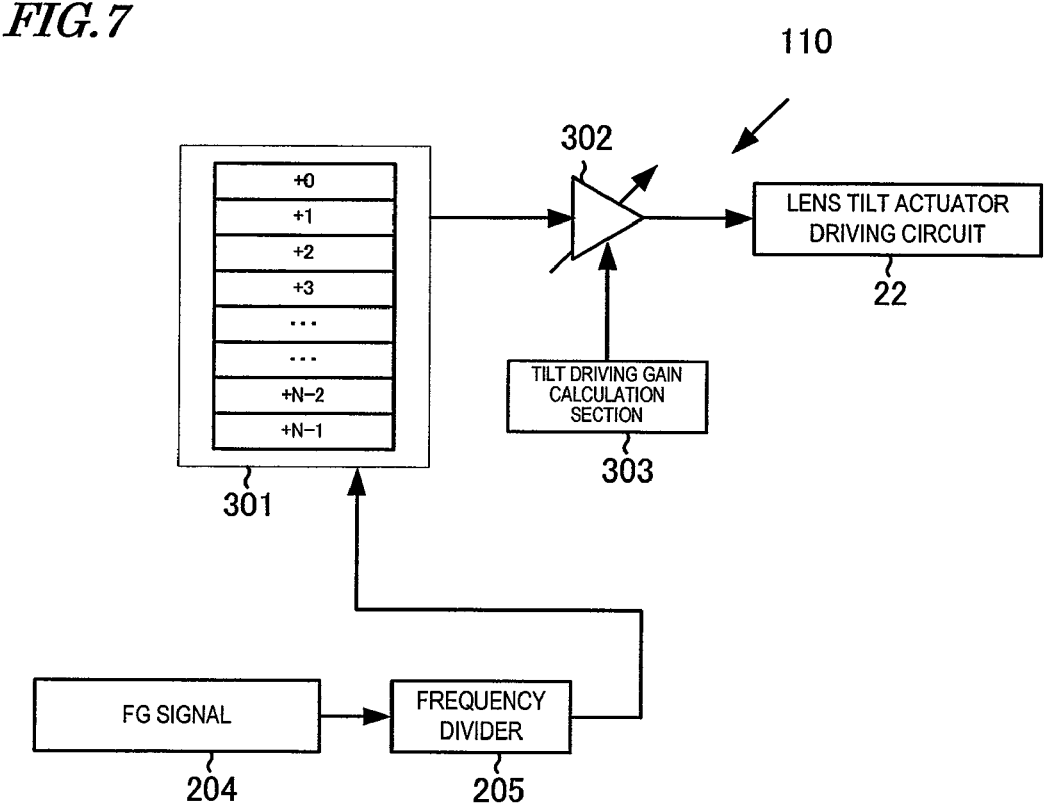
FIG. 7 A diagram showing an operation of outputting a driving signal to a lens tilt actuator driving circuit by using a tilt memory according to Embodiment 1 of the present invention.

Next, referring to FIG. 7, the procedure for copying data stored in the eccentricity memory 206 to a tilt memory 301 and performing an AC tilt correction using the data will be described.

The control section 110 includes the tilt memory 301, a lens tilt driving gain calculation section 303, and the frequency divider 205. These elements may be included in the driving control section 52.

The tilt memory 301 is a memory of the same size as the eccentricity memory 206, and data of the eccentricity memory 206 is copied to the tilt memory 301 (S11 in FIG. 5). The tilt memory 301 outputs the value stored at a predetermined address of the tilt memory 301 based on the periodic signal obtained by dividing the frequency of the FG signal 204 with the frequency divider 205.

Note that the measurement operation may be performed only once during the startup process for the optical disc apparatus and the result thereof may be stored in the tilt memory 301, and the memory does not need to be rewritten unless the optical disc is taken out.

This measurement operation does not need to be performed upon startup of the optical disc apparatus 100, but may be performed when a recording or reproduction operation to/from the optical disc 31 is requested. Then, it is possible to shorten the startup time of the optical disc apparatus 100.

The method for detecting the amount of displacement in the tracking direction is not limited to the method in which the amount of eccentricity of the disc is measured. For example, the amount of displacement in the tracking direction may be detected by calculating the reflected light from the optical disc 31. Moreover, the amount of displacement may be detected constantly based on the reflected light from the optical disc 31, without using the tilt memory 301.

Now, a method for calculating the lens tilt driving gain will be described.

Figure 8:
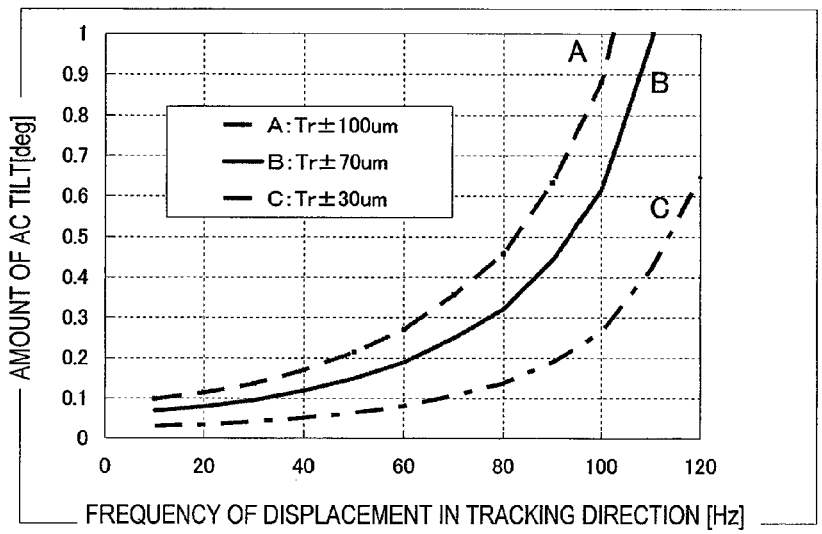
FIG. 8 A graph showing the relationship between the frequency of displacement in the tracking direction and the amount of AC tilt for each of different amounts of displacement of the objective lens in the tracking direction according to Embodiment 1 of the present invention.

FIG. 8 is a graph showing the relationship between the amount of displacement of the objective lens 1 in the tracking direction and the amount of AC tilt of the objective lens 1. For the same displacement frequency, the amount of AC tilt T1 increases in proportion to the amount of displacement d in the tracking direction, and for the same amount of displacement, the amount of AC tilt T1 increases exponentially with respect to the displacement frequency R in the tracking direction (the disc rotation frequency). Based on the above, the amount of AC tilt T1 for the amount of displacement d in the tracking direction can be expressed as follows.

$$T1 = A \times d \times \exp(B \times R)$$

In this expression, A is the amount of AC tilt per unit amount of displacement in the tracking direction, and B is the sensitivity constant, which represents the AC tilt driving sensitivity inherent to the lens tilt actuator 2.

That is, if one knows the amount of displacement of the objective lens 1 in the tracking direction and the displacement frequency, one can calculate the amount of AC tilt occurring in the objective lens 1 by the expression above.

Figure 9:
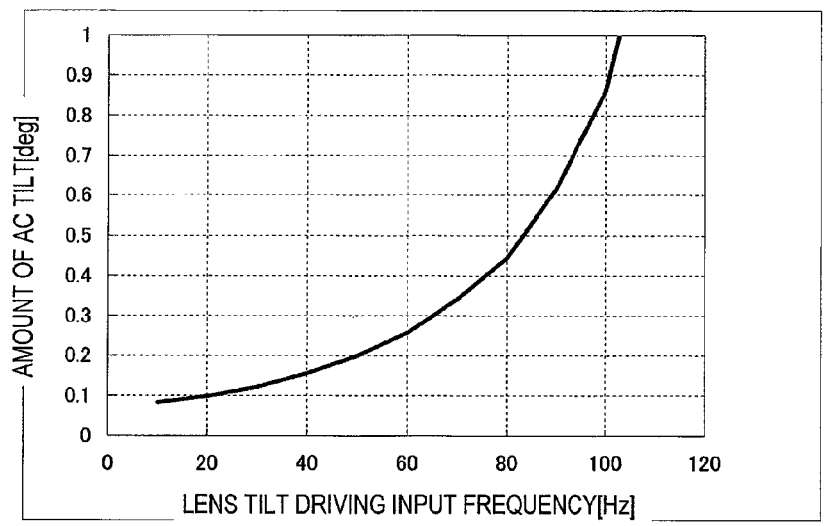
FIG. 9 A graph showing the relationship between the tilt driving output and the amount of AC tilt according to Embodiment 1 of the present invention.
Figure 10:
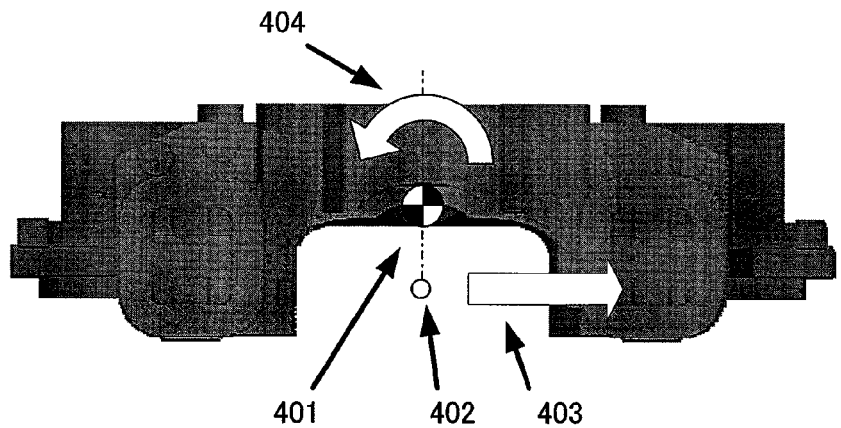
FIG. 10 A cross-sectional view showing a moving section of an optical pickup.
Figure 11:
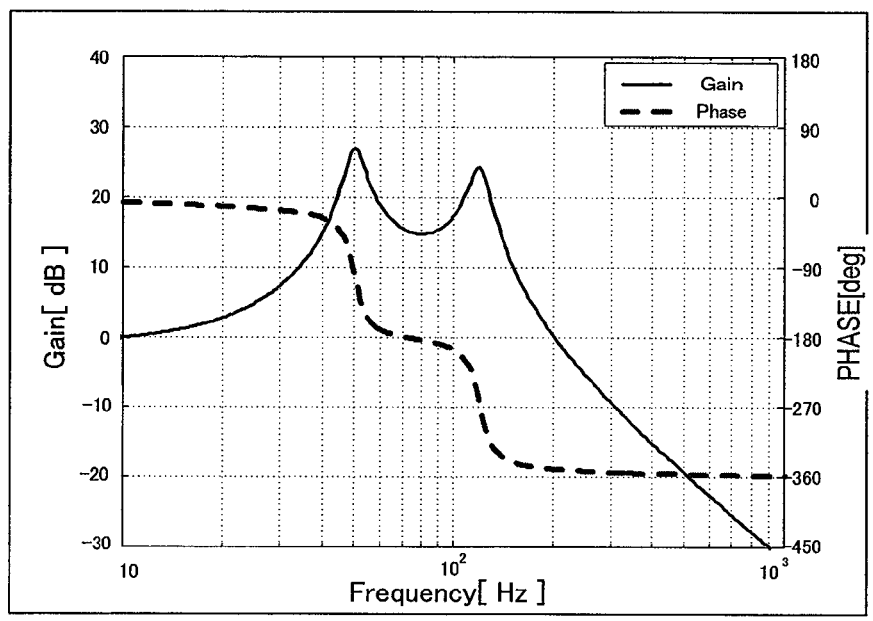
FIG. 11 A graph showing the frequency characteristics of the AC tilt where the input is the tracking driving signal.

FIG. 9 is a graph showing the relationship between the driving frequency of a driving signal having a certain amplitude and the amount of lens tilt where the lens tilt driving signal Td is given to the lens tilt actuator driving circuit 22. Since the amount of lens tilt T2 increases exponentially with respect to the driving frequency F, the amount of lens tilt T2 when the lens tilt driving signal Td is supplied can be expressed as follows.

$$T2 = C \times Td \times \exp(D \times F)$$

In this expression, C is the amount of lens tilt per unit lens tilt driving signal, and D is the lens tilt sensitivity (driving sensitivity) of the lens tilt actuator 2.

That is, the amount of lens tilt caused by the driving signal to the lens tilt actuator driving circuit 22 can be calculated by the expression above if one knows the amplitude and the frequency of the driving signal.

By the above process, it is possible to know the amount of AC tilt occurring due to the displacement in the tracking direction and the amount of lens tilt due to the driving signal to the lens tilt actuator driving circuit 22. In order to correct the AC tilt, a lens tilt driving signal Td such that T1=T2 may be given to the lens tilt actuator driving circuit 22. The frequency F of the lens tilt driving signal Td is equal to the displacement frequency in the tracking direction, i.e., the disc rotation frequency, and hence R=F.

The lens tilt driving gain calculation section 303 (FIG. 7) calculates the output of the lens tilt driving operation at a specified disc rotation frequency, and obtains the lens tilt driving gain G, which is set as a lens tilt driving gain 302. Specifically, it is expressed by the expression below.

$$G = (A/B) \times \exp(B - D)$$

In this expression, A is the amount of AC tilt per unit amount of displacement in the tracking direction, B is the AC tilt sensitivity constant inherent to the lens tilt actuator 2, and D is the lens tilt sensitivity of the lens tilt actuator 2.

In synchronism with the disc rotation, the value output from the tilt memory 301 is multiplied by the lens tilt driving gain 302, and the result is output to the lens tilt actuator driving circuit 22. Where the output value of the tilt memory 301 is denoted as TM, the lens tilt driving signal Td can be expressed as follows.

$$Td = G \times TM[n] \text{ (n: 0 to N−1, N is the number of tilt memory divisions)}$$

Thus, the AC tilt can be corrected by periodically giving a driving signal to the lens tilt actuator driving circuit 22 in synchronism with the disc rotation, and tilting the objective lens 1 by the method described above.

Figure 12:
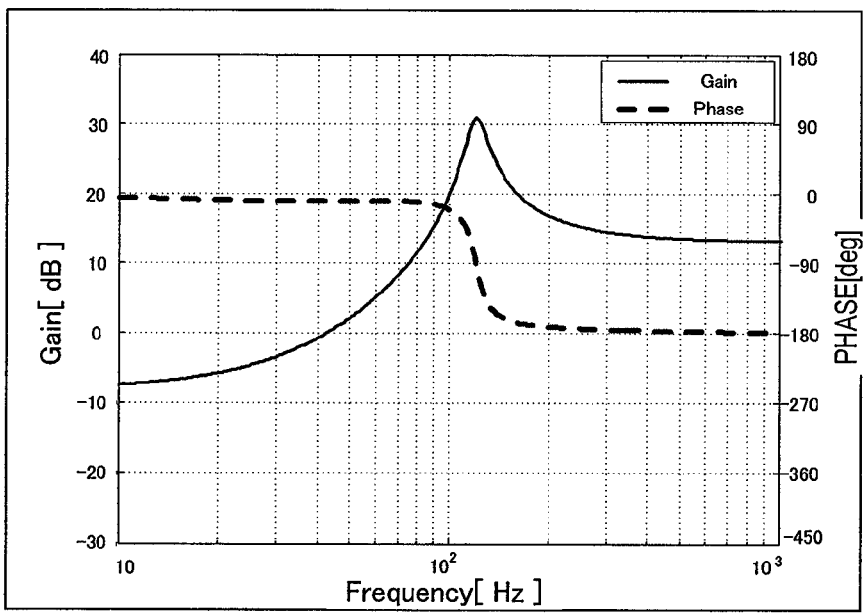
FIG. 12 A graph showing the frequency characteristics of the AC tilt where the input is the displacement in the tracking direction according to Embodiment 1 of the present invention.

FIG. 12 is a graph showing the frequency characteristics where the input is the displacement of the objective lens 1 in the tracking direction and the output is the amount of AC tilt occurring. For frequencies of up to 100 Hz, the gain characteristic increases monotonously, and the phase characteristic is substantially flat. That is, with the lens tilt control method of the present invention, it is possible to sufficiently correct the AC tilt occurring when driving the objective lens 1.

The amount of displacement in the tracking direction may be calculated only once upon startup of an optical disc and stored in the memory so that the tilt control can be performed by using the stored data in subsequent operations.

Note that where the rotation speed of the optical disc 31 is controlled with a constant linear velocity (the CLV method), the lens tilt driving gain may be recalculated as necessary. It is possible to continuously correct the AC tilt even if the rotation speed of the optical disc 31 changes over time by recalculating the lens tilt driving gain when the disc rotation speed has changed by a predetermined amount or when the radial position of recording/reproduction (or the address on the optical disc 31) has changed by a predetermined amount.

Where the rotation speed of the optical disc 31 is controlled with a constant angular velocity (the CAV method), there is no need to recalculate the lens tilt driving gain, and the AC tilt can be corrected while fixing the amount of lens tilt control.

Since an AC tilt occurs when the objective lens 1 is displaced in the tracking direction, the lens tilt driving operation for correcting the AC tilt may be performed when the tracking control is active and the lens tilt driving operation may be stopped when the tracking control is inactive.

When the amount of eccentricity of the optical disc 31 is small, the amount of AC tilt to occur is sufficiently small. Therefore, the lens tilt driving operation for correcting the AC tilt may be performed when the amount of eccentricity of the disc is greater than a predetermined threshold value, and the lens tilt driving operation may be stopped when it is less than or equal to the predetermined threshold value. That is, the lens tilt driving operation for correcting the AC tilt may be performed when the amount of displacement of the objective lens 1 in the tracking direction is greater than a predetermined threshold value, and the lens tilt driving operation may be stopped when it is less than or equal to the predetermined threshold value.

Similarly, when the rotation speed of the optical disc 31 is low, the amount of AC tilt to occur is sufficiently small. Therefore, the lens tilt driving operation for correcting the AC tilt may be performed when the disc rotation speed is greater than a predetermined threshold value and the lens tilt driving operation may be stopped when it is less than or equal to the predetermined threshold value.

Typically, the lens tilt margin is narrowed as the recording density of the optical disc 31 increases. For example, it is about 0.3° for Blu-ray discs and about 0.5° for DVDs. Therefore, the threshold values of the amount of eccentricity, the amount of displacement in the tracking direction, and the disc rotation speed may be changed depending on the type of the optical disc 31.

While the description of the present embodiment is directed to a process using the eccentricity memory 206 and the tilt memory 301, the present invention is not limited thereto. For example, an alternative arrangement may output an approximate function of the tilt output with respect to the rotation angle. In such a case, it is possible to reduce the capacity of the memory.

As described above, according to the present invention, the AC tilt can be corrected based on the amount of eccentricity of the optical disc, which is a factor for causing the displacement of the tracking actuator, and the disc rotation frequency, without being influenced by the primary resonance frequency of the tracking actuator, and it is therefore possible to realize thin optical disc apparatuses with higher speeds.

Embodiment 2

With the optical disc apparatus 100 of Embodiment 1, the AC tilt is corrected based on the eccentricity component of the optical disc 31 and the disc motor 28.

The magnitude of the AC tilt occurring in the objective lens 1 may also vary due to factors other than the eccentricity component. For example, it may vary due to initial characteristic variations of the objective lens 1, and characteristic variations thereof due to temperature variations and aging.

When these variations occur, the amount of AC tilt will vary even if the amount of displacement of the objective lens 1 in the tracking direction is constant.

Figure 13:
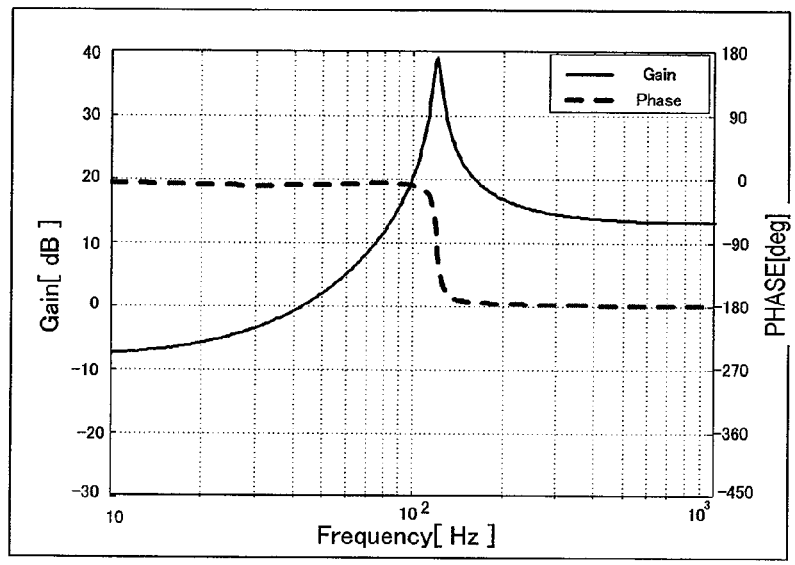
FIG. 13 A graph showing the frequency characteristics of the AC tilt where the input is the displacement in the tracking direction according to Embodiment 2 of the present invention.

FIG. 13 is a graph showing the frequency characteristics where the input is the displacement of the objective lens 1 in the tracking direction and the output is the amount of AC tilt occurring, showing frequency characteristics as the amount of AC tilt occurring varies. Even if the amount of displacement in the tracking direction and the frequency thereof are constant, the amount of AC tilt occurring varies as compared with the frequency characteristics shown in FIG. 12.

Figure 14:
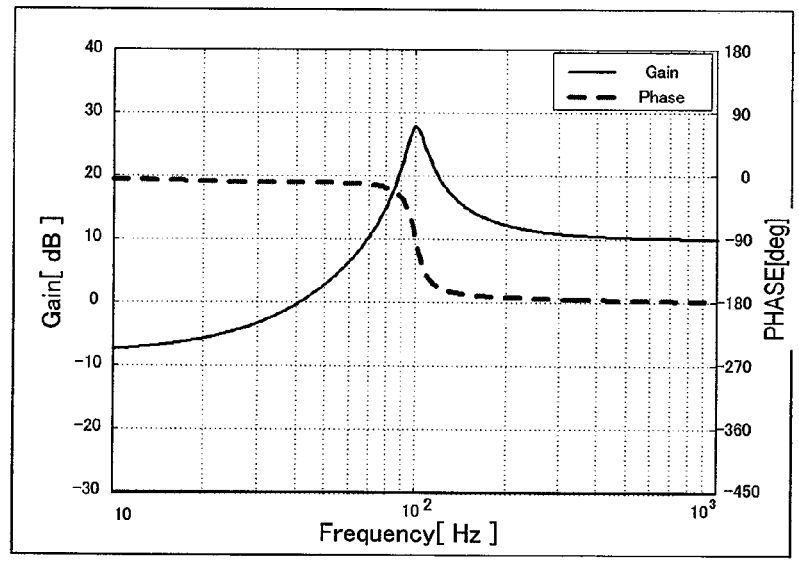
FIG. 14 A graph showing the frequency characteristics of the AC tilt where the input is the displacement in the tracking direction according to Embodiment 2 of the present invention.

FIG. 14 is a graph showing the frequency characteristics where the input is the displacement of the objective lens 1 in the tracking direction and the output is the amount of AC tilt occurring, showing frequency characteristics as the frequency at which the amount of AC tilt occurring peaks varies. The amount of AC tilt occurring decreases when the frequency at which the amount of AC tilt peaks transitions toward the higher frequency side, as compared with the frequency characteristics shown in FIG. 12, whereas the amount of AC tilt occurring increases with the phase of the AC tilt occurring being lagged when it transitions toward the lower frequency side.

With these characteristic variations, the amount of AC tilt occurring and the phase of the AC tilt vary, and therefore the optimal lens tilt driving gain or the optimal lens tilt driving output phase for correcting the AC tilt vary.

A method for adjusting the lens tilt driving gain and the lens tilt driving output phase for precisely correcting the AC tilt even under such conditions will now be described.

Figure 15:
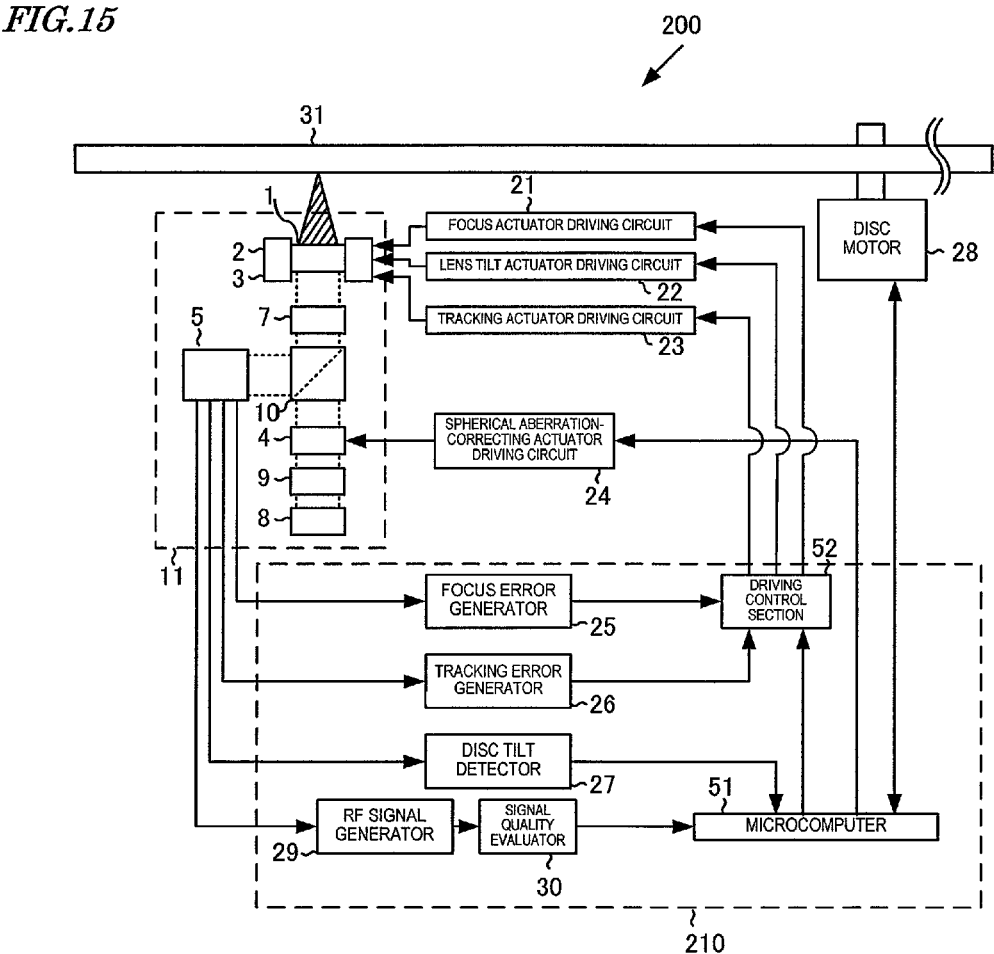
FIG. 15 A diagram showing an optical disc apparatus according to Embodiment 2 of the present invention.

FIG. 15 is a block diagram showing an optical disc apparatus 200 according to Embodiment 2 of the present invention. Like elements to those of the optical disc apparatus 100 shown in FIG. 1 are denoted by like reference numerals and will not be described in detail.

The optical disc apparatus 200 includes a control section 210. In addition to the elements of the control section 110 (FIG. 1), the control section 210 further includes an RF signal generator 29 and a signal quality evaluator 30. The signal quality evaluator 30 serves as an index generator section for generating a reproduction signal quality index, which represents the quality of the reproduction signal obtained by reproducing information recorded on the optical disc. The reproduction signal quality index is, for example, a signal representing the jitter, and the lens tilt is controlled based on the measured jitter.

The light-receiving section 5 converts the reflected light from the optical disc 31 into an electrical signal. The output signal of the light-receiving section 5 is supplied to the focus error generator 25, the tracking error generator 26, the disc tilt detector 27, and the RF signal generator 29.

The RF signal generator 29 generates an RF signal based on the output signal of the light-receiving section 5. The RF signal is supplied to the signal quality evaluator 30.

The signal quality evaluator 30 generates the jitter from the RF signal, and supplies the jitter to the microcomputer 51. The signal quality evaluator 30 is not limited to the function of generating the jitter from the RF signal. For example, it may be the RF signal amplitude or the error rate. The type of the index may be any type as long as it is an index based on which the quality of the reproduction signal can be evaluated. A lens tilt control where the jitter is employed as the reproduction signal quality index will be described below.

The microcomputer 51 obtains the optimal values of the lens tilt driving gain and the lens tilt driving output phase based on the relationship of the lens tilt driving gain and the lens tilt driving output phase with respect to the jitter value, and supplies the optimal values to the driving control section 52.

A method for varying the lens tilt driving output phase will now be described. Referring to FIG. 7, the phase variation is realized by adding an offset to the address to be referred to when outputting a value stored at a predetermined address of the tilt memory 301 based on the periodic signal output from the frequency divider 205. For example, where there is a total of N tilt memory sections, and the amount of offset to be added to the address to be referred to is n, the phase can be varied by n/N×360°. The phase can be advanced if n is a positive value, and lagged if it is a negative value.

Next, referring to the flow chart shown in FIG. 16, a method for adjusting the lens tilt driving gain will be described.

First, the objective lens 1 is moved to a recorded area in order to perform a gain adjustment (S101).

Next, a lens tilt driving gain is set (S102), and the jitter per one disc revolution is measured (S103). Thereafter, the operations of step S102 and step S103 are repeated while successively varying the lens tilt driving gain until a measurement ending condition is satisfied (S104).

Herein, the condition for the measurement to be ended may be until the number of times the measurement has been performed exceeds a predetermined number or until such a result that the jitter is minimized is obtained.

Then, the optimal lens tilt driving gain is calculated and set based on the obtained measurement result (S105). The optimal lens tilt driving gain is a lens tilt driving gain that minimizes the jitter, for example. Alternatively, the relationship between the set lens tilt driving gain and the jitter may be approximated by a quadratic function, and a lens tilt driving gain that gives the minimum value may be chosen.

The optimal lens tilt driving gain can be obtained by performing the process described above.

Next, referring to the flow chart shown in FIG. 17, a method for adjusting the lens tilt driving output phase will be described.

Figure 16:
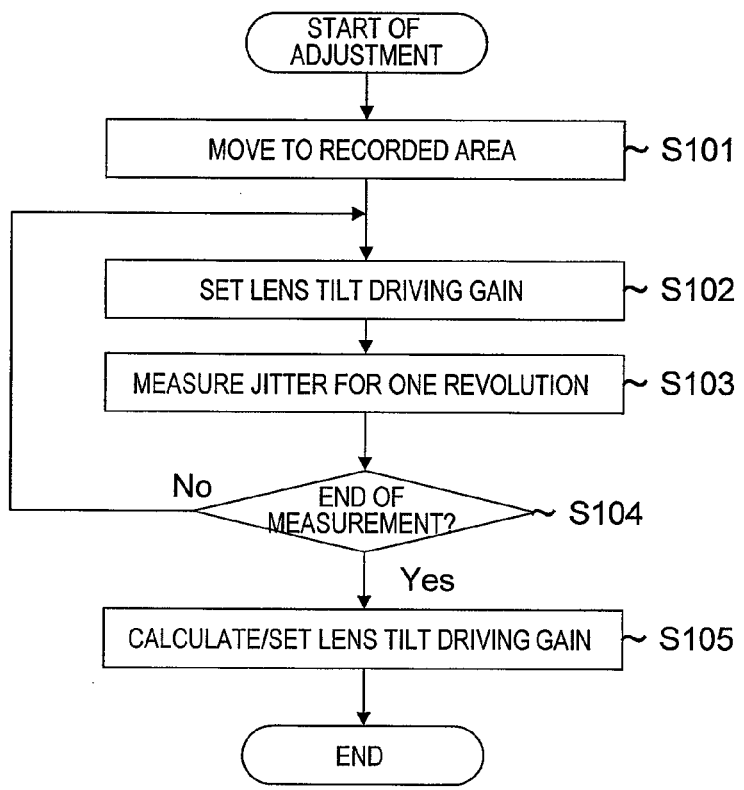
FIG. 16 A flow chart showing a process of adjusting the lens tilt driving gain according to Embodiment 2 of the present invention.
Figure 17:
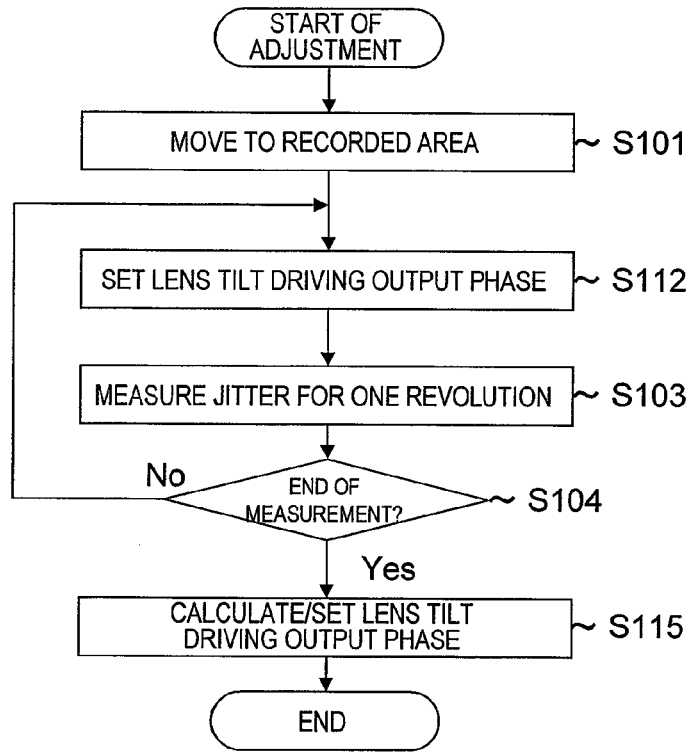
FIG. 17 A flow chart showing a process of adjusting the lens tilt driving output phase according to Embodiment 2 of the present invention.

The operations of steps S101, S103 and S104 shown in FIG. 17 are the same as those of the same steps shown in FIG. 16.

The operation of setting a lens tilt driving output phase (S112) and measuring the jitter (S103) is repeated, and the optimal lens tilt driving output phase is calculated and set based on the obtained result (S115).

By performing the process described above, it is possible to set the optimal lens tilt driving gain and the optimal lens tilt driving output phase.

Embodiment 3

The optical disc apparatus 200 (FIG. 15) of Embodiment 3 adjusts the lens tilt driving gain with a DC tilt applied to the objective lens 1.

Figure 18:
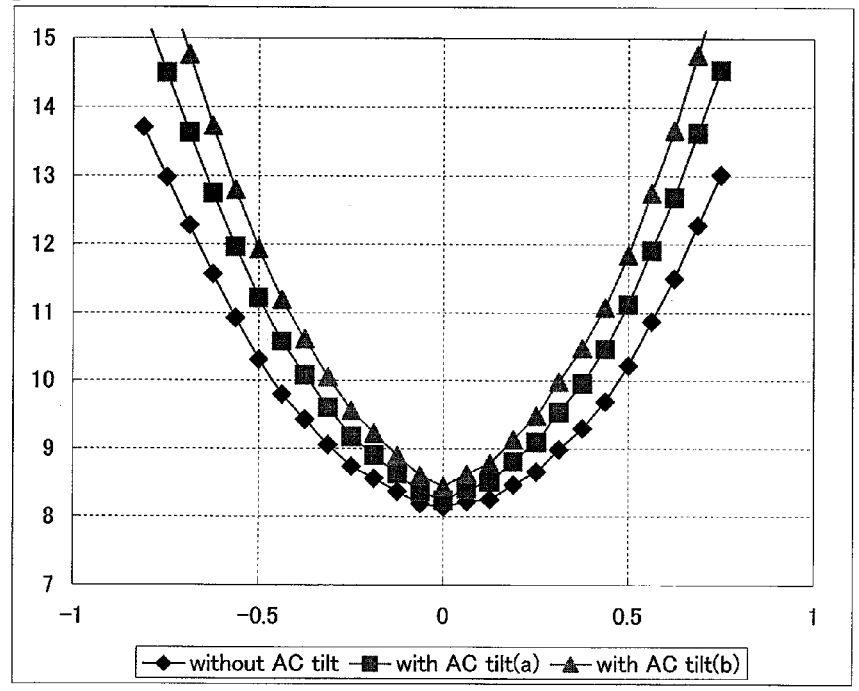
FIG. 18 A graph showing the relationship between the lens tilt and the average jitter for one disc revolution according to Embodiment 3 of the present invention.

FIG. 18 is a graph showing the relationship between the amount of DC tilt and the average jitter for one disc revolution, showing how the relationship changes with the amount of AC tilt. The horizontal axis represents the amount of DC tilt, and the vertical axis represents the average jitter for one disc revolution.

The DC tilt as used herein refers to the amount of tilt occurring when the objective lens 1 is tilted in a DC-like manner with a fixed value irrespective of the rotation of the disc, as opposed to the AC tilt.

In FIG. 18, "with AC tilt (a)" denotes the characteristic where the amount of AC tilt occurring is small) (0.2°), and "with AC tilt (b)" denotes the characteristic where the amount of AC tilt occurring is large (0.3°). In any case, it can be seen that the jitter increases quadratically with respect to the DC tilt, and the average jitter for one disc revolution deteriorates as the amount of AC tilt increases.

Figure 19:
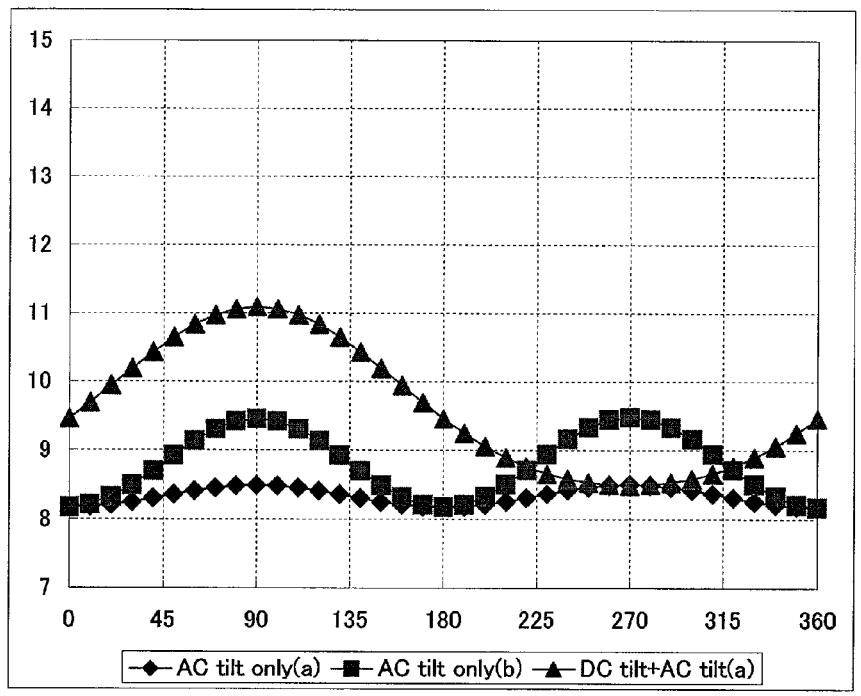
FIG. 19 A graph showing the relationship between the lens tilt and the change of jitter within one disc revolution according to Embodiment 3 of the present invention.

FIG. 19 is a graph showing, for each of different DC tilt-AC tilt combinations, the jitter varying as the disc makes one revolution. The horizontal axis represents the disc rotation angle, and the vertical axis represents the jitter value taken at different disc rotation angles.

In the graph, "AC tilt only (a)" denotes the characteristic where the DC tilt is 0° and the AC tilt is 0.2°. "AC tilt only (b)" denotes the characteristic where the DC tilt is 0° and the AC tilt is 0.3°. "DC tilt+AC tilt (a)" denotes the characteristic where the DC tilt is 0.2° and the AC tilt is 0.2°. The DC tilt values and the AC tilt values shown herein correspond to those on the horizontal axis of FIG. 18.

With "AC tilt only (a)", it can be seen that the jitter deteriorates whether the lens tilt caused by an AC tilt is toward the + side or toward the – side, and therefore the jitter deteriorates twice within one disc revolution.

With "AC tilt only (b)", it can be seen that with an increase in the amount of AC tilt, the jitter deteriorates more than with "AC tilt only (a)".

With "DC tilt+AC tilt (a)", it is shown that the jitter deteriorates substantially when the objective lens 1 is tilted by an AC tilt toward the + side, but the jitter improves when it is tilted oppositely toward the – side. As described above, since the jitter increases quadratically with respect to the amount of DC tilt, the amount of jitter deterioration is large when the lens is tilted in such a direction that the jitter deteriorates, whereas the amount of jitter deterioration is small when the lens is tilted in such a direction that the jitter improves, thus making more pronounced the jitter variation within one disc revolution.

Next, referring to the flow chart shown in FIG. 20, a method for adjusting the lens tilt driving gain will be described.

First, the objective lens 1 is moved to a recorded area in order to perform a gain adjustment (S201).

Then, a DC tilt toward the + side is applied to the objective lens 1 (S202). If a DC tilt is applied as described above, the jitter variation within one disc revolution due to the AC tilt becomes more pronounced and, therefore, the change in jitter entailing a change in the lens tilt driving gain can be made more readily seen, thereby improving the adjustment precision.

The jitter is measured as the lens tilt driving gain is changed in such a state, and the lens tilt driving gain is adjusted to an optimal value (S203). The adjustment procedure has already been described with reference to FIG. 16, and therefore will not be described below.

Then, a DC tilt toward the – side is applied (S204), and the lens tilt driving gain is adjusted to an optimal value (S205).

Finally, the lens tilt driving gains obtained in the processes of step S203 and step S205 are averaged together to obtain an optimal value, and the optimal value is set (S206). Where there is no substantial difference between the lens tilt driving gains obtained in the processes of step S203 and step S205, one of the adjustment results may be employed as the optimal value. This has an effect of shortening the adjustment time.

By performing the above processes, it is possible to adjust the lens tilt driving gain more precisely and optimally.

Embodiment 4

While a method for adjusting the lens tilt driving output phase has been described above with reference to FIG. 17, an adjustment can be performed within a shorter period of time by performing an adjustment by the following procedure.

Referring to the flow chart shown in FIG. 21, a method for adjusting the lens tilt driving gain will be described.

First, the objective lens 1 is moved to a recorded area in order to perform an adjustment (S301).

Then, a DC tilt is applied to the objective lens 1 (S302). The direction of the DC tilt applied may be either toward the +side or toward the –side, as long as the goal of making the jitter variation within one disc revolution more pronounced is achieved.

Then, the jitter variation within one disc revolution is measured (S303). As described above, the jitter characteristic to be obtained will be as shown in FIG. 19 depending on the amount of DC tilt or the amount of AC tilt at that time. Herein, one disc revolution is divided into N sections, and the jitter is measured for each of the divided sections.

The process searches for the maximum value and the minimum value from the measured jitter characteristics within one disc revolution (S304).

Then, the output phase of the lens tilt driving signal is adjusted so that the disc rotation angles corresponding to the maximum value and the minimum value of the jitter values coincide with the maximum and the minimum of the lens tilt driving signal (S305).

By performing an adjustment by the process described above, the output phase of the lens tilt driving operation can be adjusted optimally within the amount of time for measurement for one disc revolution.

Embodiment 5

Figure 20:
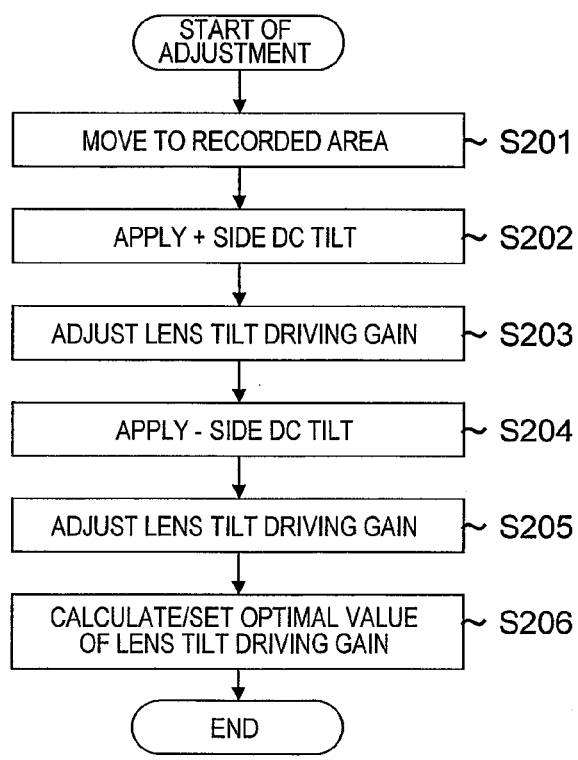
FIG. 20 A flow chart showing a process of adjusting the lens tilt driving gain according to Embodiment 3 of the present invention.

By the adjustment method shown in FIGS. 16 and 20, the lens tilt driving gain is adjusted based on the average jitter over one disc revolution. A method for adjusting the lens tilt driving gain so that the jitter variation within one disc revolution is minimized will now be described as an alternative method.

Figure 22:
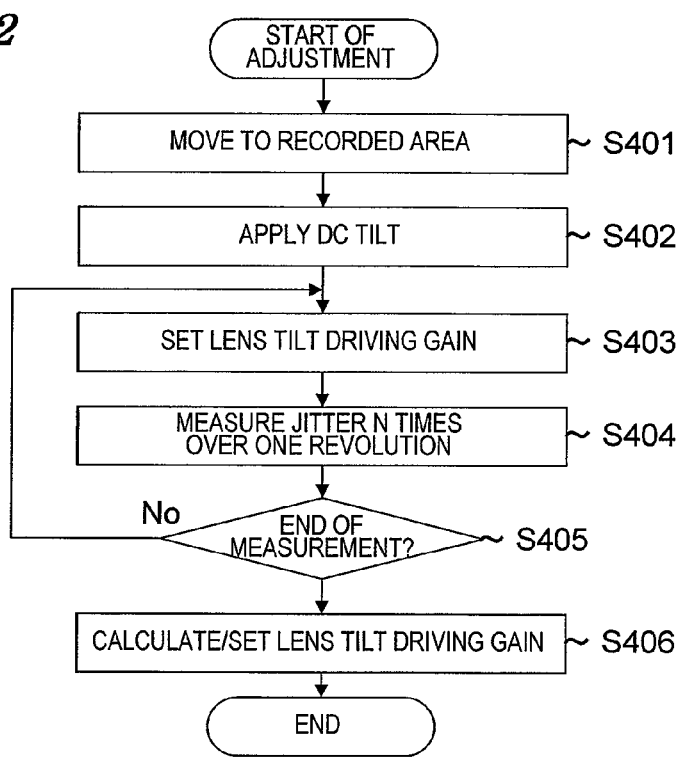
FIG. 22 is a flow chart showing a process of adjusting the lens tilt driving gain according to Embodiment 5 of the present invention.

A method for adjusting the lens tilt driving gain will be described with reference to the flow chart shown in FIG. 22.

Figure 21:
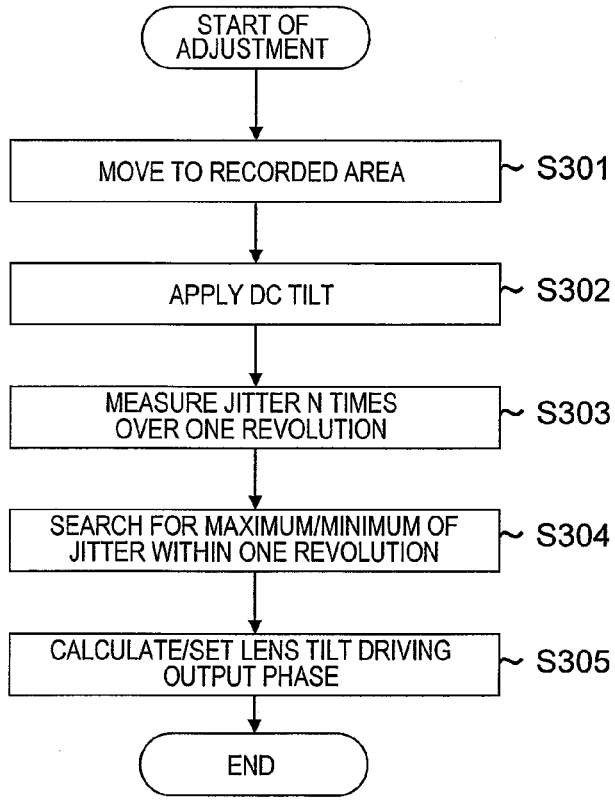
FIG. 21 A flow chart showing a process of adjusting the lens tilt driving output phase according to Embodiment 4 of the present invention.

The operations of step 401 and step 402 are similar to those of step 301 and step 302 shown in FIG. 21.

After the operation of step 402, the lens tilt driving gain is varied successively (S403) and the jitter variation within one disc revolution is measured (S404). Herein, one disc revolution is divided into N sections, and the jitter is measured for each of the divided sections. Thereafter, the operations of step S403 and step S404 are repeated until a measurement ending condition is satisfied (S405).

Herein, the condition for the measurement to be ended is the identification of the gain with which the amount of jitter variation within one disc revolution as measured in step S404 is minimized. For example, it may be defined as being when the amount of jitter variation is less than or equal to a predetermined value (e.g., 0.3% or less), or the relationship between the lens tilt driving gain and the amount of jitter variation may be approximated by a function and an optimal value can be calculated therefrom.

Then, an optimal lens tilt driving gain is obtained and set, thus completing the adjustment (S406).

By performing an adjustment by the process above, it is possible to adjust the lens tilt driving gain so that the jitter variation within one disc revolution is minimized, and it is therefore possible to stabilize the reproduction characteristic within one disc revolution.

Embodiment 6

With any of the adjustment methods of Embodiments 2 to 5, the driving signal is adjusted with the index being a reproduction characteristic such as jitter. However, where the amount of AC tilt occurring initially is very large, even if one attempts to adjust the lens tilt driving gain and the lens tilt driving output phase using the reproduction performance as an index, the tracking control may become unstable or the reproduction performance may be very poor so that the adjustment fails.

In view of this, in the present embodiment, a first-step adjustment is performed first, in which the lens tilt driving gain and the lens tilt driving output phase are adjusted based on the amount of eccentricity of the disc obtained when the tracking control is inactive. Then, while a tracking control reflecting the adjustment result is active, a second-step adjustment is next performed, in which the lens tilt driving gain and the lens tilt driving output phase are adjusted based on the jitter.

Figure 23:
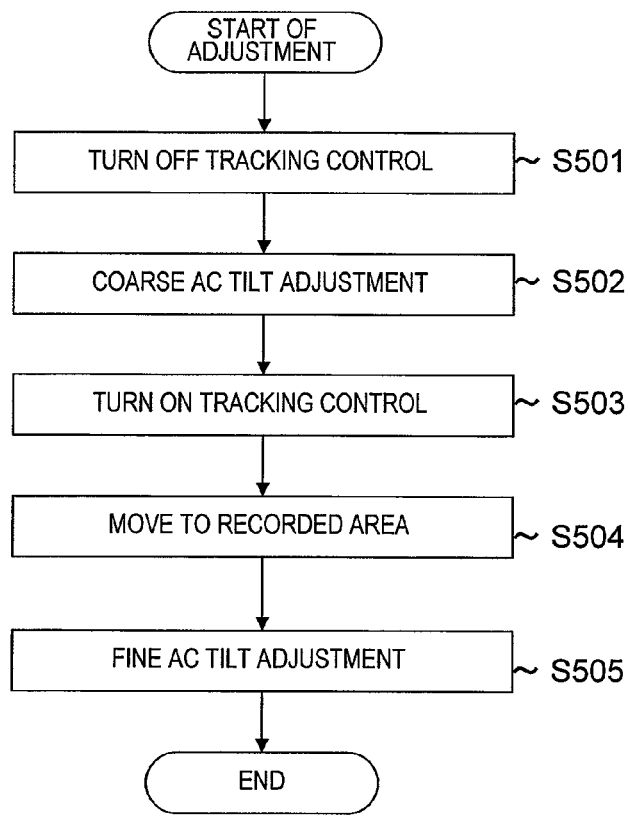
FIG. 23 is a flow chart showing a process of adjusting the lens tilt driving gain according to Embodiment 6 of the present invention.

Using the flow chart shown in FIG. 23, the procedure of adjusting the lens tilt driving gain and the lens tilt driving output phase will be described.

First, the tracking control is inactivated (S501).

Then, a first-step adjustment process, referred to as the "coarse AC tilt adjustment", is performed (S502). The first-step adjustment process is the adjustment process described above in Embodiment 1. The lens tilt driving gain and the lens tilt driving output phase are adjusted based on the amount of eccentricity of the disc.

Then, the tracking control is activated (S503), the objective lens 1 is moved to a recorded area (S504), and the second-step adjustment process, referred to as the "fine AC tilt adjustment" is performed (S505). The second-step adjustment process is the adjustment process described above in Embodiments 2 to 5. The lens tilt driving gain and the lens tilt driving output phase are adjusted based on the reproduction signal quality evaluation index (e.g., the jitter).

By performing the adjustment in two steps as described above, it is possible to reliably optimize the lens tilt driving gain and the lens tilt driving output phase even for an optical pickup with a very large AC tilt occurring.

Note that the tracking control may be performed in the first-step adjustment, and the amount of displacement of the objective lens 1 in the tracking direction may be determined from the driving signal for driving the tracking actuator 3 for the tracking control, so that the lens tilt driving gain and the lens tilt driving output phase are adjusted based on the amount of displacement. Then, in the next second-step adjustment process, the lens tilt driving gain and the lens tilt driving output phase are adjusted based on the reproduction signal quality evaluation index. Even when the amount of displacement of the objective lens 1 in the tracking direction is determined from the driving signal of the tracking actuator 3, the lens tilt driving gain and the lens tilt driving output phase can be optimized more reliably by performing the second-step adjustment process.

Note that the adjustment result obtained by the adjustment process described above in Embodiments 2 to 6 can be treated independently of the adjustment result obtained in the adjustment process described above in Embodiment 1.

The disc rotation frequency during the lens tilt driving gain adjustment may be stored, and the adjustment result may be reflected in the calculation expression for obtaining the lens tilt driving gain from the change in the disc rotation frequency as described above in Embodiment 1.

Specifically, the correction coefficient K is obtained as follows:

$$K = Ga/Gi$$

where Gi is the calculation result of the lens tilt driving gain at a disc rotation frequency during an initial phase of lens tilt driving gain adjustment, and Ga is the optimal lens tilt driving gain obtained by the adjustment. The optimal lens tilt driving gain can be obtained by multiplying the calculation result of the lens tilt driving gain, which is obtained from the change in the disc rotation frequency as described above in Embodiment 1, by the correction coefficient K.

With the method described above, the adjustment result of the lens tilt driving gain with which the reproduction performance is optimized can be applied to the entire region of the optical disc 31.

Note that at least some of the elements of the optical disc apparatuses 100 and 200 may be implemented in the form of an LSI, which is an integrated circuit. Each of integrated elements may be implemented on a single chip, or a plurality of elements may be implemented together on a single chip. While the term "LSI" is used herein as the type of integrated circuit used herein, integrated circuits are also called "ICs", "system LSIs", "super LSIs" or "ultra LSIs" depending on the degree of integration.

Moreover, the form of an integrated circuit is not limited to an LSI, but may alternatively be implemented as a dedicated circuit or a general-purpose processor. It may alternatively be an FPGA (FIELD PROGRAMMABLE GATE ARRAY), which is programmable after the LSI is manufactured, or a reconfigurable processor in which the interconnections and settings of circuit cells in the LSI can be reconfigured.

Furthermore, if advancements in the semiconductor technology or derivative technologies bring forth a new form of circuit integration replacing LSIs, the new form of circuit integration can be used for the integration of the various elements. One possibility is the application of biotechnology, for example.

INDUSTRIAL APPLICABILITY

The present invention is particularly useful in technical fields in which information is recorded and/or reproduced optically.

The invention claimed is:

1. An optical disc apparatus for irradiating an optical disc with laser light to perform at least one of recording and reproduction of information to/from the optical disc, the apparatus comprising:
    an optical pickup including an objective lens for concentrating the laser light;
    a tracking actuator for displacing the objective lens in a tracking direction along a radial direction of the optical disc;
    a lens tilt actuator for tilting the objective lens in the radial direction of the optical disc;
    a tracking actuator driving section for driving the tracking actuator;
    a lens tilt actuator driving section for driving the lens tilt actuator; and
    a control section for controlling an operation of the tracking actuator driving section and that of the lens tilt actuator driving section, wherein:
    the control section measures, for each passage of a predetermined rotation angle of the optical disc, the number of tracks of the optical disc a light spot of the laser light has crossed when a tracking control is not being performed;
    the control section calculates an amount of displacement of the objective lens in the tracking direction based on a change in the number of tracks crossed for each passage of the predetermined rotation angle; and
    the control section controls the tilt of the objective lens based on the amount of displacement in the tracking direction and a rotation speed of the optical disc.

2. The optical disc apparatus of claim 1, wherein the control section includes a memory, and the amount of displacement in the tracking direction is calculated only once upon startup of the optical disc and stored in the memory.

3. The optical disc apparatus of claim 1, wherein the control section controls the tilt of the objective lens based further on a driving sensitivity of the lens tilt actuator.

4. The optical disc apparatus of claim 1, wherein where the rotation speed of the optical disc is controlled by a CLV method, the control section recalculates an amount by which the tilt of the objective lens is controlled when the rotation speed of the optical disc has changed by a predetermined amount.

5. The optical disc apparatus of claim 1, wherein where the rotation speed of the optical disc is controlled by a CLV method, the control section recalculates an amount by which the tilt of the objective lens is controlled when a radial position of the objective lens has changed by a predetermined amount.

6. The optical disc apparatus of claim 1, wherein where the rotation speed of the optical disc is controlled by a CAV method, the control section controls the tilt of the objective lens while fixing the amount by which the tilt is controlled.

7. The optical disc apparatus of claim 1, further comprising an index generator section for generating a reproduction signal quality index representing a quality of a reproduction signal obtained by reproducing information recorded on the optical disc, wherein
    the control section adjusts a driving signal for tilting the objective lens based on the displacement of the objective lens in the tracking direction when a tracking control is not being performed; and
    the control section adjusts the driving signal based on the reproduction signal quality index measured with the objective lens tilted when the tracking control is being performed.

8. The optical disc apparatus of claim 7, wherein the control section adjusts the driving signal based on the displacement of the objective lens in the tracking direction, and then adjusts the driving signal based on the reproduction signal quality index.

9. The optical disc apparatus of claim 8, wherein the control section calculates the amount of displacement of the objective lens in the tracking direction based on a driving signal for driving the tracking actuator when the tracking control is being performed.

10. An optical disc apparatus for irradiating an optical disc with laser light to perform at least one of recording and reproduction of information to/from the optical disc, the apparatus comprising:
    an optical pickup including an objective lens for concentrating the laser light;
    a tracking actuator for displacing the objective lens in a tracking direction along a radial direction of the optical disc;
    a lens tilt actuator for tilting the objective lens in the radial direction of the optical disc;
    a tracking actuator driving section for driving the tracking actuator;
    a lens tilt actuator driving section for driving the lens tilt actuator;
    a control section for controlling an operation of the tracking actuator driving section and that of the lens tilt actuator driving section; and
    an index generator section for generating a reproduction signal quality index representing a quality of a reproduction signal obtained by reproducing information recorded on the optical disc,
    wherein the control section controls the tilt of the objective lens based on the reproduction signal quality index measured with the objective lens tilted at a fixed value irrespective of a rotation of the optical disc.

11. The optical disc apparatus of claim 10, wherein:
    the index generator section generates the reproduction signal quality index a plurality of times over one revolution of the optical disc; and
    the control section controls the tilt of the objective lens based on a change in the reproduction signal quality index over one revolution of the optical disc.

12. The optical disc apparatus of claim 11, wherein the control section controls the tilt of the objective lens based on an average value of the reproduction signal quality indices over one revolution of the optical disc.

13. The optical disc apparatus of claim 11, wherein the control section controls the tilt of the objective lens based on a change in a value of the reproduction signal quality index over one revolution of the optical disc.

14. The optical disc apparatus of claim 10, wherein where the rotation speed of the optical disc is controlled by a CLV method, the control section recalculates an amount by which the tilt of the objective lens is controlled when the rotation speed of the optical disc has changed by a predetermined amount.

15. The optical disc apparatus of claim 10, wherein where the rotation speed of the optical disc is controlled by a CLV method, the control section recalculates an amount by which the tilt of the objective lens is controlled when a radial position of the objective lens has changed by a predetermined amount.

16. A control method for controlling a lens tilt of an optical disc apparatus for irradiating an optical disc with laser light to perform at least one of recording and reproduction of information to/from the optical disc, the method comprising:
- a tracking step of displacing an objective lens of an optical pickup in a tracking direction along a radial direction of the optical disc;
- a lens tilt step of tilting the objective lens in the radial direction of the optical disc; and
- a control step of controlling the tilt of the objective lens based on the displacement of the objective lens in the tracking direction, the control step comprising:
- a step of measuring, for each passage of a predetermined rotation angle of the optical disc, the number of tracks of the optical disc a light spot of the laser light has crossed when a tracking control is not being performed;
- a step of calculating an amount of displacement of the objective lens in the tracking direction based on a change in the number of tracks crossed for each passage of the predetermined rotation angle; and
- a step of controlling the tilt of the objective lens based on the amount of displacement in the tracking direction and a rotation speed of the optical disc.

17. The control method of claim 16, further comprising:
- an index generating step of generating a reproduction signal quality index representing a quality of a reproduction signal obtained by reproducing information recorded on the optical disc; and
- an adjustment step of adjusting a driving signal for tilting the objective lens based on the displacement of the objective lens in the tracking direction when a tracking control is not being performed, while adjusting the driving signal based on the reproduction signal quality index when the tracking control is being performed.

18. A control method for controlling a lens tilt of an optical disc apparatus for irradiating an optical disc with laser light to perform at least one of recording and reproduction of information to/from the optical disc, the method comprising:
- a lens tilt step of tilting an objective lens of an optical pickup in a radial direction of the optical disc;
- an index generating step of generating a reproduction signal quality index representing a quality of a reproduction signal obtained by reproducing information recorded on the optical disc; and
- a control step of controlling the tilt of the objective lens based on the reproduction signal quality index measured with the objective lens tilted at a fixed value irrespective of a rotation of the optical disc.

19. The control method of claim 18, wherein:
- the index generating step includes a step of generating the reproduction signal quality index a plurality of times over one revolution of the optical disc; and
- the control step includes a step of controlling the tilt of the objective lens based on a change in the reproduction signal quality index over one revolution of the optical disc.

20. An integrated circuit provided in an optical disc apparatus for irradiating an optical disc with laser light to perform at least one of recording and reproduction of information to/from the optical disc, the optical disc apparatus comprising:
- an optical pickup including an objective lens for concentrating the laser light;
- a tracking actuator for displacing the objective lens in a tracking direction along a radial direction of the optical disc;
- a lens tilt actuator for tilting the objective lens in the radial direction of the optical disc;
- a tracking actuator driving section for driving the tracking actuator; and
- a lens tilt actuator driving section for driving the lens tilt actuator,
- the integrated circuit comprising a control section for controlling an operation of the tracking actuator driving section and that of the lens tilt actuator driving section, wherein:
- the control section measures, for each passage of a predetermined rotation angle of the optical disc, the number of tracks of the optical disc a light spot of the laser light has crossed when a tracking control is not being performed;
- the control section calculates an amount of displacement of the objective lens in the tracking direction based on a change in the number of tracks crossed for each passage of the predetermined rotation angle; and
- the control section controls the tilt of the objective lens based on the amount of displacement in the tracking direction and a rotation speed of the optical disc.

21. The integrated circuit of claim 20, further comprising an index generator section for generating a reproduction signal quality index representing a quality of a reproduction signal obtained by reproducing information recorded on the optical disc, wherein:
- the control section adjusts a driving signal for tilting the objective lens based on the displacement of the objective lens in the tracking direction when a tracking control is not being performed; and
- the control section controls the tilt of the objective lens based on the reproduction signal quality index measured with the objective lens tilted when the tracking control is being performed.

22. An integrated circuit provided in an optical disc apparatus for irradiating an optical disc with laser light to perform at least one of recording and reproduction of information to/from the optical disc, the optical disc apparatus comprising:
- an optical pickup including an objective lens for concentrating the laser light;
- a tracking actuator for displacing the objective lens in a tracking direction along a radial direction of the optical disc;
- a lens tilt actuator for tilting the objective lens in the radial direction of the optical disc;
- a tracking actuator driving section for driving the tracking actuator; and
- a lens tilt actuator driving section for driving the lens tilt actuator,
- the integrated circuit comprising:
- a control section for controlling an operation of the tracking actuator driving section and that of the lens tilt actuator driving section; and
- an index generator section for generating a reproduction signal quality index representing a quality of a reproduction signal obtained by reproducing information recorded on the optical disc,
- wherein the control section controls the tilt of the objective lens based on the reproduction signal quality index measured with the objective lens tilted at a fixed value irrespective of a rotation of the optical disc.

23. The integrated circuit of claim 22, wherein:
- the index generator section generates the reproduction signal quality index a plurality of times over one revolution of the optical disc; and the control section controls the tilt of the objective lens based on a change in the reproduction signal quality index over one revolution of the optical disc.

24. The optical disc apparatus of claim 11, wherein the control section makes an adjustment such that a signal for driving the lens tilt actuator driving section also takes an extreme value at a rotation angle of the optical disc at which the reproduction signal quality index takes an extreme value.

* * * * *